(12) United States Patent
Agrawal

(10) Patent No.: US 12,481,512 B2
(45) Date of Patent: Nov. 25, 2025

(54) PRODUCING RESOURCES ACCORDING TO HANDLING SETTINGS FOR SELECTIVELY ADDING RESOURCES PRODUCED BY ONLINE SOFTWARE PLATFORM (OSP)

(71) Applicant: Avalara, Inc., Seattle, WA (US)

(72) Inventor: Naveen Kumar Agrawal, Bellevue, WA (US)

(73) Assignee: Avalara, Inc., Seattle, WA (US)

( * ) Notice: Subject to any disclaimer, the term of this patent is extended or adjusted under 35 U.S.C. 154(b) by 72 days.

(21) Appl. No.: 18/659,401

(22) Filed: May 9, 2024

(65) Prior Publication Data

US 2025/0103354 A1    Mar. 27, 2025

Related U.S. Application Data

(60) Provisional application No. 63/585,678, filed on Sep. 27, 2023.

(51) Int. Cl.
*G06F 9/44* (2018.01)
*G06F 9/445* (2018.01)

(52) U.S. Cl.
CPC ............................... *G06F 9/44505* (2013.01)

(58) Field of Classification Search
None
See application file for complete search history.

(56) References Cited

U.S. PATENT DOCUMENTS

| | | |
|---|---|---|
| 7,783,536 B2 | 8/2010 | William et al. |
| 7,933,803 B1 | 4/2011 | Nadler et al. |
| 8,156,019 B2 | 4/2012 | Wilson et al. |
| 8,620,578 B1 | 12/2013 | Brown et al. |
| 8,725,407 B2 | 5/2014 | Hurley et al. |
| 9,760,915 B2 | 9/2017 | Pavlou et al. |
| 10,332,216 B2 | 6/2019 | Barsade et al. |
| 10,445,818 B1 | 10/2019 | Chowdhary |
| 10,723,657 B2 | 7/2020 | Perie |
| 10,769,611 B2 | 9/2020 | McNeel |
| 10,872,100 B1 | 12/2020 | Shefferman et al. |
| 11,176,620 B1 | 11/2021 | Lubczynski et al. |

(Continued)

OTHER PUBLICATIONS

International Search Report and Written Opinion, PCT App. No. PCT/US2024/028500, Sep. 16, 2024, 12 pages.

*Primary Examiner* — Keshab R Pandey
(74) *Attorney, Agent, or Firm* — Nicholson, De Vos, Webster & Elliott, LLP

(57) ABSTRACT

In embodiments, in processes that can be repeated numerous times, relationship instance data is inputted, of relationship instances between primary entities and secondary entities. For a relationship instance, an outbound dataset is constructed that has dataset parameters with respective dataset values. One of the dataset values characterizes an attribute of one of the entities, and another encodes a base value for the relationship instance data. The outbound dataset is transmitted across a network to an Online Software Platform (OSP) computer system. The OSP computer system produces, according to digital rules, two or more resources for the dataset, and an inbound dataset is returned with the results, for forwarding to an output device. Handling settings are also inputted by a UI. Depending on the handling settings, one of the resources is added, or not, to the base value for a user as part of forwarded results.

7 Claims, 16 Drawing Sheets

FIRST EMBODIMENTS

(56) References Cited

U.S. PATENT DOCUMENTS

| | | |
|---|---|---|
| 11,238,542 B1 | 2/2022 | Wixted et al. |
| 11,475,430 B2 | 10/2022 | Burton et al. |
| 2002/0138765 A1 | 9/2002 | Fishman et al. |
| 2007/0136158 A1 | 6/2007 | Rawlings et al. |
| 2007/0136159 A1 | 6/2007 | Rawlings et al. |
| 2010/0254394 A1* | 10/2010 | Barta .................... H04L 67/142 370/401 |
| 2013/0013471 A1 | 1/2013 | Fishman |
| 2014/0172656 A1 | 6/2014 | Shaw |
| 2014/0351105 A1 | 11/2014 | Hamm |
| 2016/0042466 A1 | 2/2016 | Herndon et al. |
| 2016/0140668 A1 | 5/2016 | Maguire et al. |
| 2021/0158456 A1 | 5/2021 | Morgan et al. |
| 2022/0005092 A1* | 1/2022 | Agrawal ............... G06Q 20/207 |
| 2022/0006872 A1 | 1/2022 | Kavounas et al. |
| 2022/0397990 A1* | 12/2022 | Swaminathan ........... G06F 3/14 |
| 2022/0398285 A1 | 12/2022 | Rose et al. |

* cited by examiner

FIG. 1 — FIRST EMBODIMENTS

DATASET VALUES INVOKING DIFFERENT TYPES OF POSSIBLE DIGITAL RESOURCE RULES

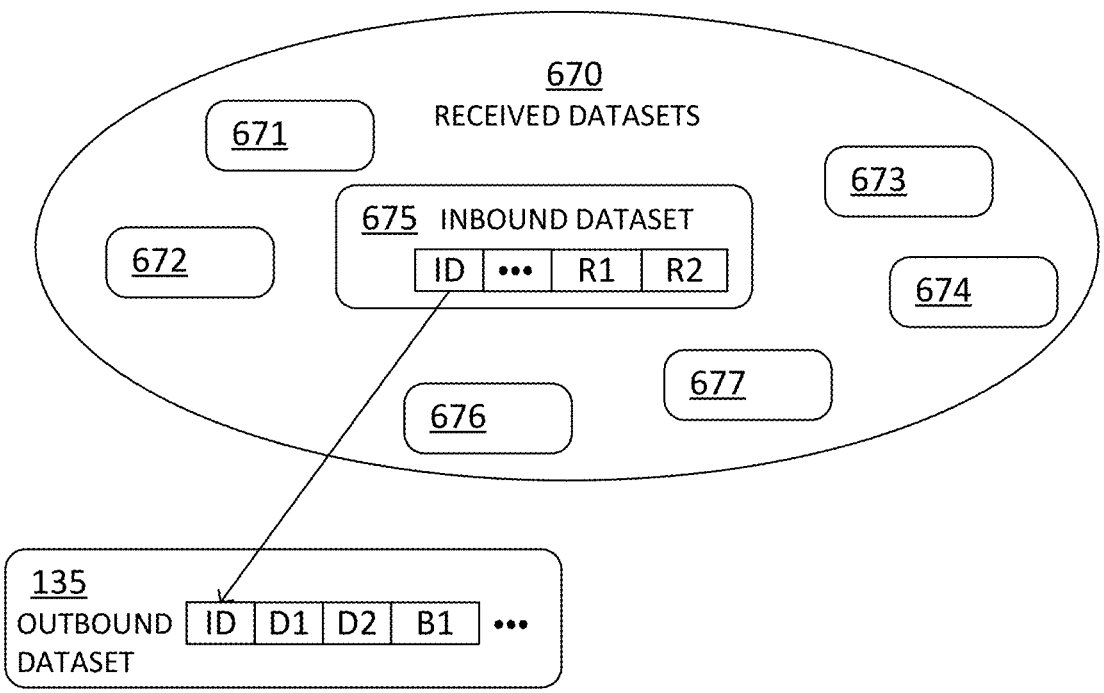
FIG. 6 — IDENTIFYING INBOUND DATASET BY MATCHING ID PARAMETER OF OUTBOUND DATASET
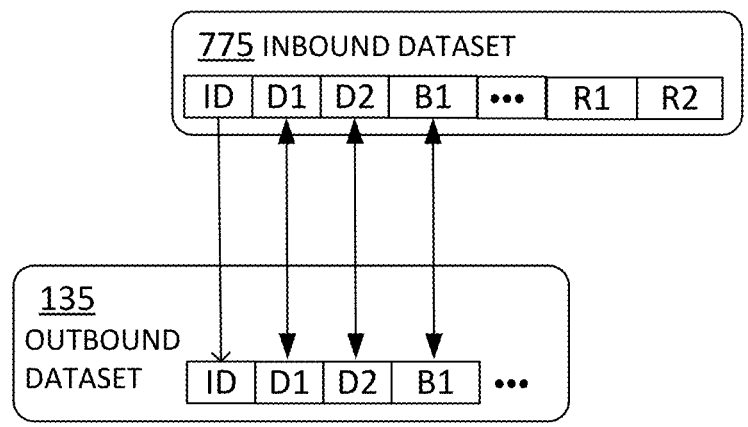
FIG. 7 — IDENTIFYING INBOUND DATASET BY MATCHING ADDITIONAL PARAMETERS OF OUTBOUND DATASET

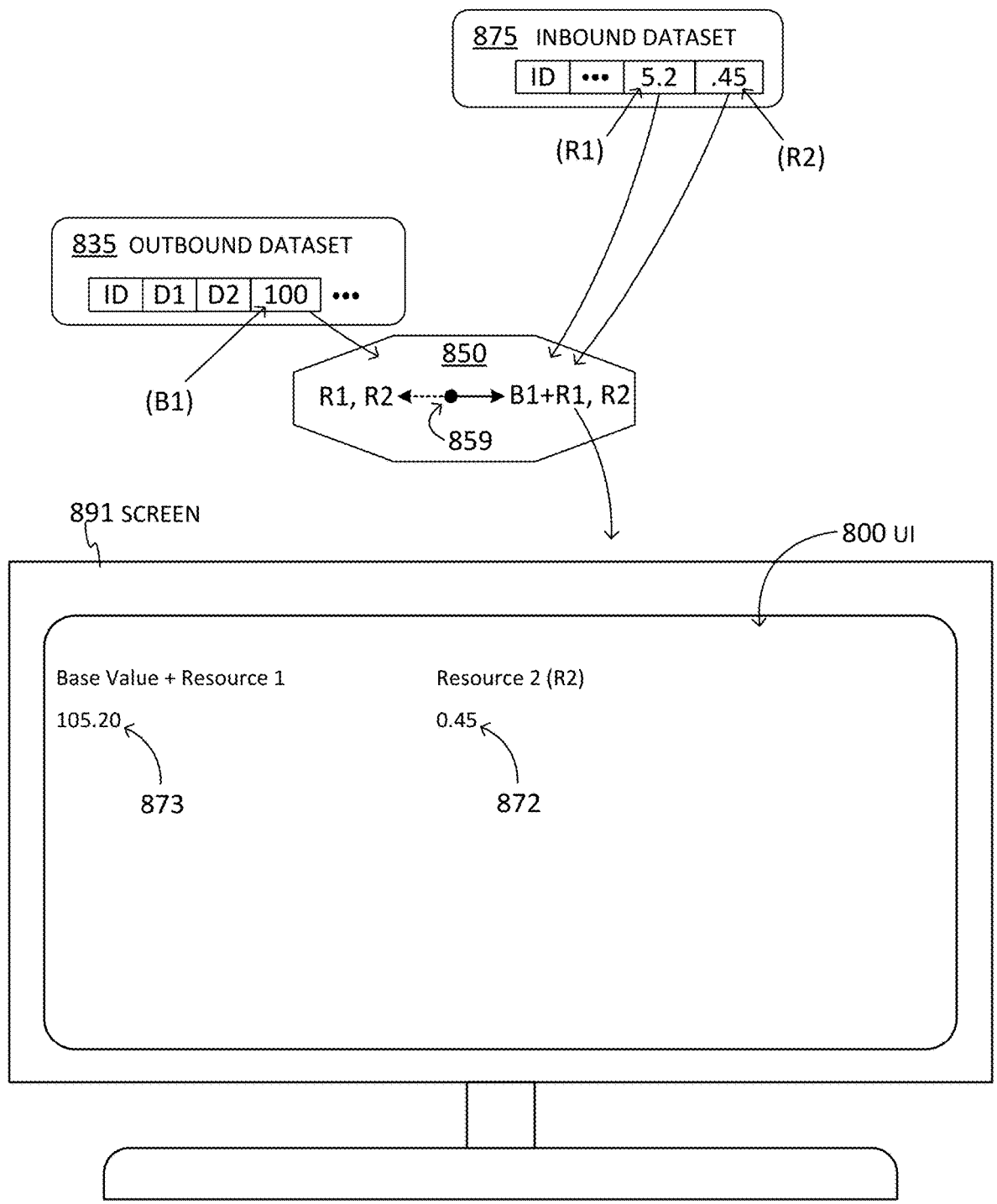
FIG. 8  *USER INTERFACE (UI)*

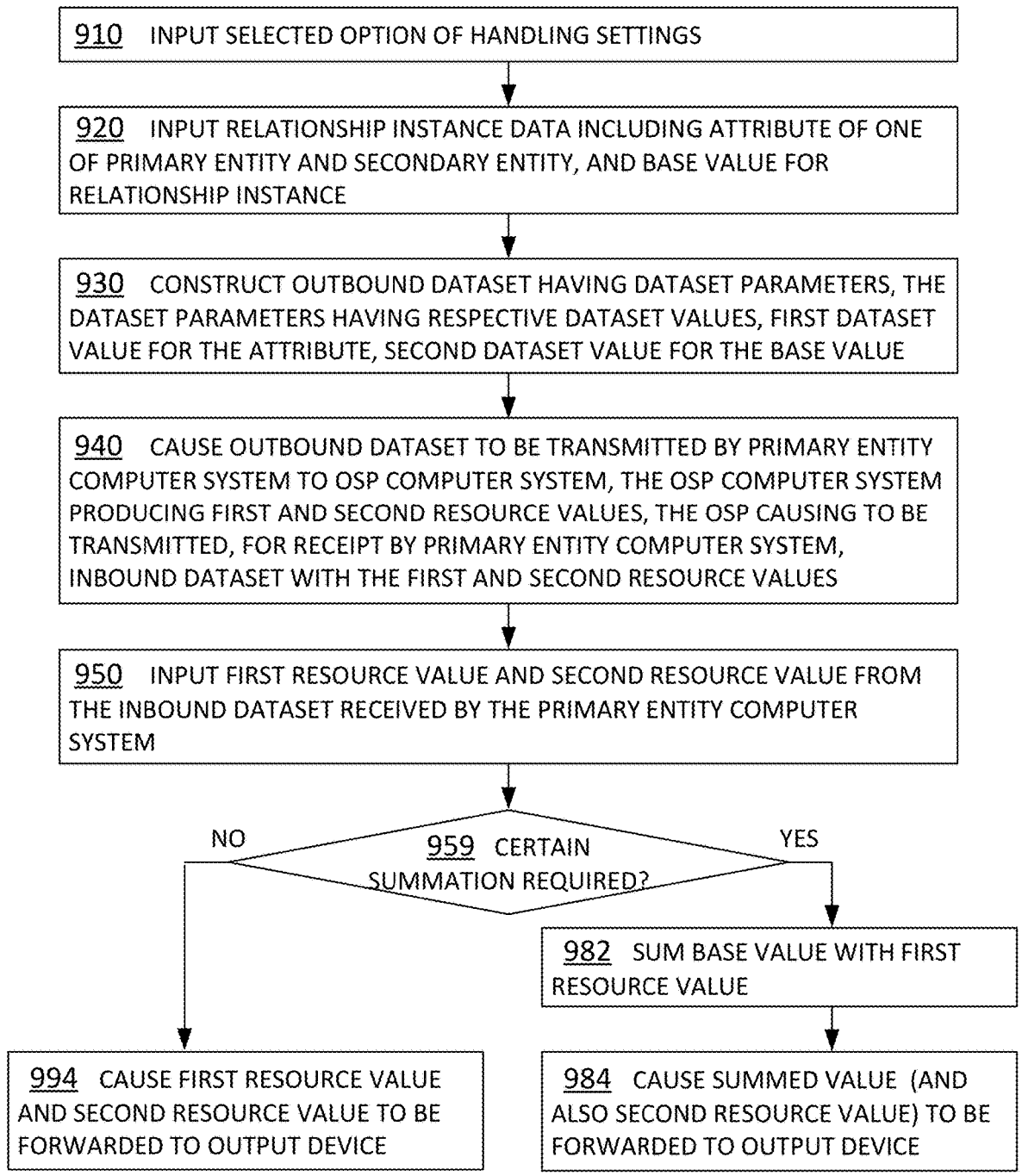
FIG. 9  METHODS

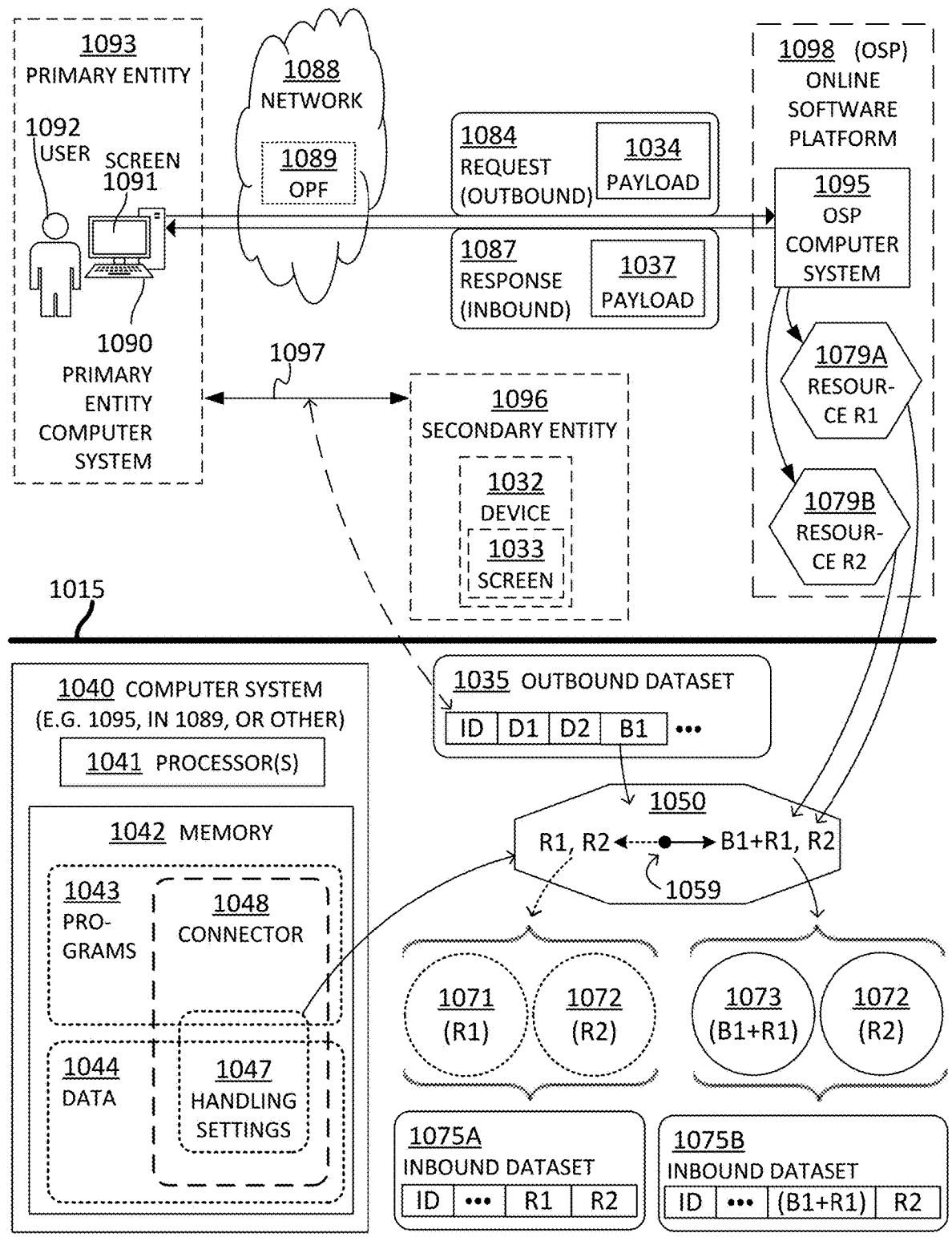
FIG. 10  *SECOND EMBODIMENTS*

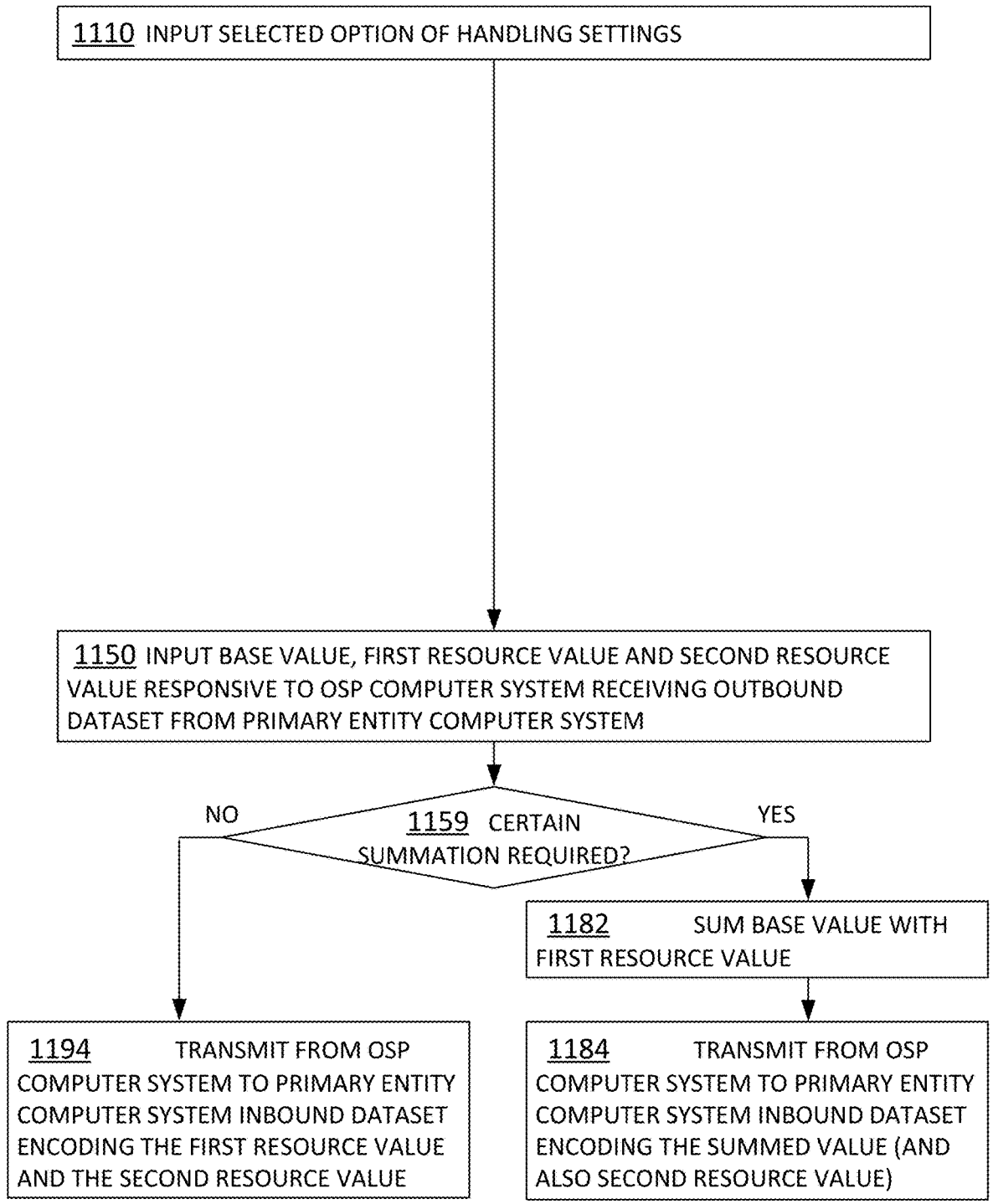
FIG. 11     METHODS

FIG. 13   USE CASE

FIG. 14     USE CASE

*DATASET VALUES INVOKING DIFFERENT TYPES OF POSSIBLE DIGITAL TAX RULES*

*USER INTERFACE (UI)*

PRODUCING RESOURCES ACCORDING TO HANDLING SETTINGS FOR SELECTIVELY ADDING RESOURCES PRODUCED BY ONLINE SOFTWARE PLATFORM (OSP)

CROSS-REFERENCE TO RELATED APPLICATIONS

This patent application claims priority from U.S. provisional patent application Ser. No. 63/585,678, filed on Sep. 27, 2023.

BACKGROUND

Online software platforms perform computations and make determinations for clients by communicating with devices of the clients over computer networks.

All subject matter discussed in this Background section of this document is not necessarily prior art, and may not be presumed to be prior art simply because it is presented in this Background section. Plus, any reference to any prior art in this description is not, and should not be taken as, an acknowledgement or any form of suggestion that such prior art forms parts of the common general knowledge in any art in any country. Along these lines, any recognition of problems in the prior art discussed in this Background section or associated with such subject matter should not be treated as prior art, unless expressly stated to be prior art. Rather, the discussion of any subject matter in this Background section should be treated as part of the approach taken towards the particular problem by the inventor. This approach in and of itself may also be inventive.

SUMMARY

The present description gives instances of computer systems, storage media that may store programs, and methods. In embodiments, in processes that can be repeated numerous times, relationship instance data is inputted, of relationship instances between primary entities and secondary entities. For a relationship instance, an outbound dataset is constructed that has dataset parameters with respective dataset values. One of the dataset values characterizes an attribute of one of the entities, and another encodes a base value for the relationship instance data. The outbound dataset is transmitted across a network to an Online Software Platform (OSP) computer system. The OSP computer system produces, according to digital rules, two or more resources for the dataset, and an inbound dataset is returned with the results, for forwarding to an output device. Handling settings are also inputted by a UI. Depending on the handling settings, one of the resources is added, or not, to the base value for a user as part of forwarded results.

Embodiments may deliver the results to, or as part of, Enterprise Resource Planning (ERP) applications, which can be consumed more efficiently by the ERP applications, while integrating well into existing technical environments. Since embodiments may assist in configuring the presentation of forwarded results, the systems and methods described herein may reduce the overall processing, storage, and/or data transmission resources needed, and thereby may enable the tasks at the end to be performed by less capable, less capacious, and/or less expensive hardware devices, and may enable these tasks to be performed with less latency and/or preserve more of the conserved resources for use in performing other tasks or additional instances of the same task. As such, the computer systems, storage media and methods improve the functioning of computer or other hardware.

As such, it will be appreciated that embodiments have utility, and in fact may cause results that are larger than the sum of their individual parts.

These and other features and advantages of the claimed invention will become more readily apparent in view of the embodiments described and illustrated in this specification, namely in this written specification and the associated drawings.

BRIEF DESCRIPTION OF THE DRAWINGS

FIG. 6 is a diagram that shows an embodiment of how a dataset that is received is identified to be the inbound dataset that has been sent responsive to an outbound dataset.

FIG. 7 is a diagram that shows another embodiment of how a dataset that is received is identified to be the inbound dataset that has been sent responsive to an outbound dataset.

FIG. 8 is a composite diagram showing how parameter values may be displayed in a User Interface (UI), according to an embodiment and responsive to a selected option of handling settings.

FIG. 9 is a flowchart for illustrating sample methods according to the first embodiments of FIG. 1, which are improvements in automated computerized systems.

FIG. 10 is a diagram showing sample aspects of second embodiments, which are improvements in automated computerized systems.

FIG. 11 is a flowchart for illustrating sample methods according to the second embodiments of FIG. 10, which are improvements in automated computerized systems.

DETAILED DESCRIPTION

As has been mentioned, the present description is about computer systems, storage media that may store programs such as computer memories, and methods. Embodiments are now described in more detail.

First Embodiments

Figure 1:
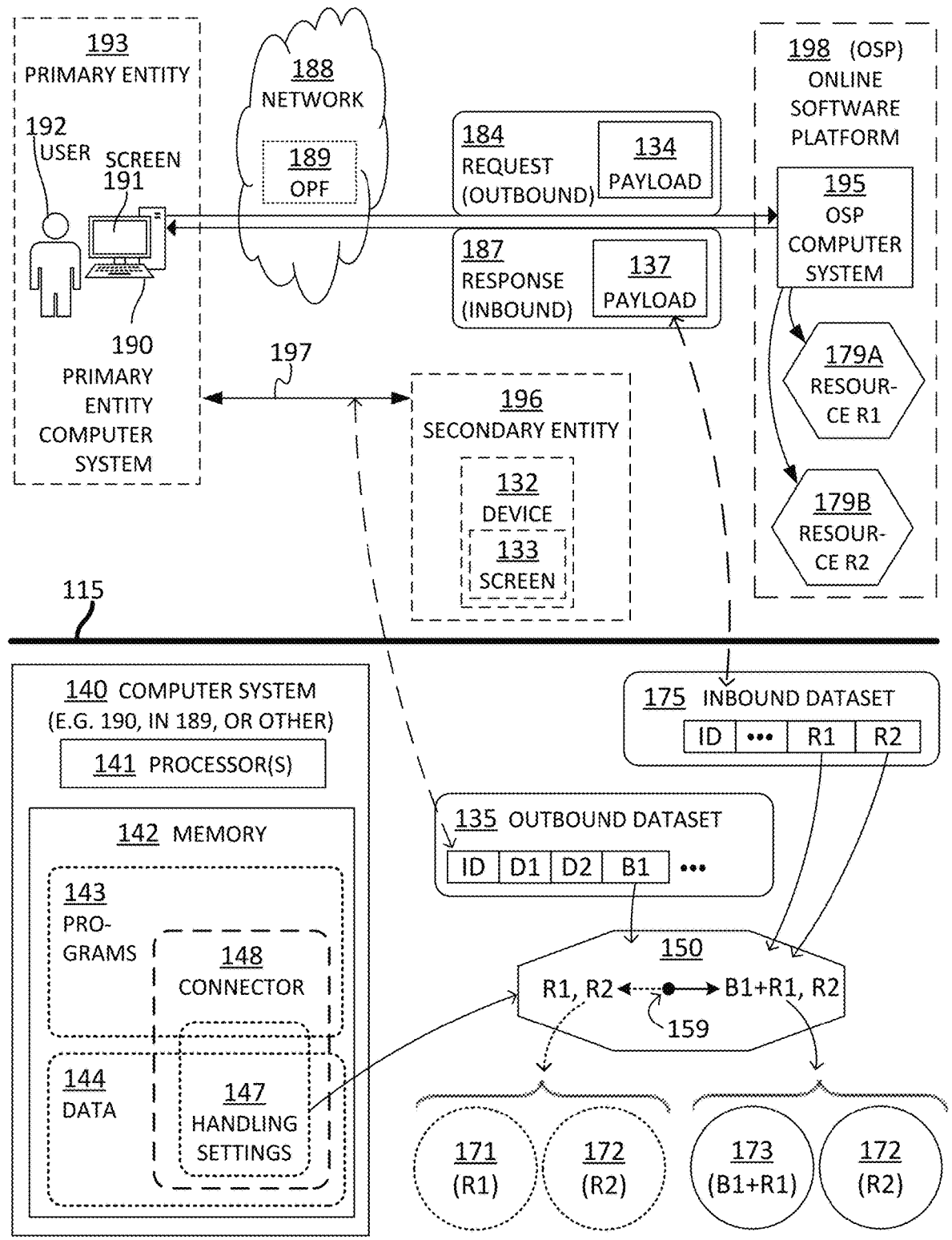
FIG. 1 is a diagram showing sample aspects of first embodiments, which are improvements in automated computerized systems.

FIG. 1 is a diagram showing sample aspects of first embodiments. A thick horizontal line 115 separates this diagram, although not completely or rigorously. Above the line 115 are shown elements with more emphasis on entities, components, their relationships, and their interactions, while below the line 115 are shown elements with more emphasis on where certain elements reside, and processing of data that takes place often within one or more of the components that are shown above the line 115.

Above the line 115, a sample OSP computer system 195 according to embodiments is shown. The OSP computer system 195 can be located in "the cloud." In fact, the OSP computer system 195 may optionally be implemented as part of an Online Software Platform (OSP) 198. The OSP computer system 195 can be configured to perform one or more predefined services. Such services can be searches, determinations, computations, verifications, notifications, the transmission of specialized information, including data that effectuates payments, the generation and transmission of documents, the online accessing of other systems to effect registrations, and so on, including what is described in this document. Such services can be provided in the form of Software as a Service (SaaS). As such, the OSP 198 can be an online service provider. In embodiments, the OSP computer system 195 is configured to produce a resource R1 179A, a resource R2 179B, and optionally additional resources.

A user 192 may be standalone. The user 192 may use a primary entity computer system 190 that has a screen 191, on which User Interfaces (UIs) may be shown. In embodiments, the user 192 and the primary entity computer system 190 are considered part of a primary entity 193, which could be an organization, an institution, and so on. In such instances, the user 192 can be an agent of the primary entity 193, and even within a physical site of the entity 193, although that is not necessary. In embodiments, the primary entity computer system 190 or other device of the user 192 can be client devices for the OSP computer system 195. The user 192 or the primary entity 193 may use the services of the OSP 198. For instance, the user 192 may log into the OSP computer system 195 by using credentials, such as a user name, a password, a token, and so on.

The primary entity computer system 190 may access the OSP computer system 195 via a communications network 188, such as the internet. In particular, the entities and associated systems of FIG. 1 may communicate via physical and logical channels of the communications network 188. For example, information may be communicated as data using the Internet Protocol (IP) suite over a packet-switched network such as the Internet or other packet-switched network, which may be included as part of the communications network 188. The communications network 188 may include many different types of computer networks and communication media, including those used by various different physical and logical channels of communication, now known or later developed. Non-limiting media and communication channel examples include one or more, or any operable combination of: fiber optic systems, satellite systems, cable systems, microwave systems, Asynchronous Transfer Mode ("ATM") systems, frame relay systems, Digital Subscriber Line ("DSL") systems, Radio Frequency ("RF") systems, telephone systems, cellular systems, other wireless systems, and the Internet. In various embodiments the communications network 188 can be or include any type of network, such as a Local Area Network (LAN), a Metropolitan Area Network (MAN), a Wide Area Network (WAN), or the internet. Accordingly, from certain perspectives, the OSP 198 is in the cloud.

Accessing, downloading and/or uploading, and so on may be permitted among these computer systems. Such can be performed, for instance, with manually uploading files, like spreadsheet files, etc. Such can also be performed automatically as shown in the example of FIG. 1, with systems exchanging requests and responses.

Moreover, in some embodiments, data from the primary entity computer system 190 and/or from the OSP computer system 195 may be stored in an Online Processing Facility (OPF) 189 that can run software applications, perform operations, and so on. In such embodiments, requests and responses may be exchanged with the OPF 189, downloading or uploading may involve the OPF 189, and so on. In such embodiments, the primary entity computer system 190 and any devices of the OPF 189 can be considered to be remote devices, at least from the perspective of the OSP computer system 195.

In embodiments, the user 192 and/or the primary entity 193 have instances of relationships with secondary entities. Only one such secondary entity 196 is shown. The secondary entity 196 can be an organization, a person, and so on. In some embodiments, the secondary entity 196 has a device 132, which can be an electronic device such as a cellphone, tablet, laptop, computer system and so on. The device 132 may have a screen 133. In this example, the primary entity 193 has a relationship instance 197 with the secondary entity 196. In fact, the secondary entity 196 may have used a device such as the device 132 to create the relationship instance 197. The primary entity 193 and/or the secondary entity 196 may be referred to as simply entities. One of these entities may have one or more attributes. Such an attribute of such an entity may be any one of its name, type of entity, a physical or geographical location such as an address, a contact information element, an affiliation, a characterization of another entity, a characterization by another entity, an association or relationship with another entity (general or specific instances), an asset of the entity, a declaration by or on behalf of the entity, a specific domain that the entity belongs in a context of multiple domains that are defined in terms of the above, and so on.

In some instances, the user 192 and/or the primary entity 193 obtain data about one or more secondary entities, for example as necessary for conducting the relationship instances with them. The obtained data can be about attributes of the entities, or of the relationship instances.

Below the line 115, a computer system 140 is shown. In some embodiments, the computer system 140 is the primary entity computer system 190. In other embodiments, the computer system 140 is controlled by the primary entity 193, and could be in the cloud, communicating with the primary entity computer system 190. For instance, in such embodiments, the computer system 140 could be in the OPF 189.

The computer system 140 has one or more processors 141 and a memory 142. The memory 142, which is a non-transitory computer-readable medium, is configured to store programs 143 and data 144. The programs 143 may include instructions that can be executed by the one or more processors 141.

Handling settings 147 reside in the memory 142. The handling settings 147 may be some of the programs 143 and the data 144. The handling settings 147 have options, one of which can be selected. At least a first one of the options, which of course can also be called the first option, requires a certain summation of values in datasets. Instances of the certain summation are described later in this document. A second one of the options, which of course can also be called the second option, does not require the certain summation.

The handling settings 147 may be part of an optional connector 148. In the event that the computer system 140 is indeed the primary entity computer system 190, then the connector 148 can be a local connector 148. Such a local connector 148 may have been downloaded for better interfacing with the OSP computer system 195. Otherwise, the connector 148 may be a virtual connector, and so on.

In embodiments, a selected one of the options of the handling settings 147 is input by the computer system 140. In some of these embodiments, the selected option of the handling settings 147, which can also be called the selected option, is input via a user interface (UI) that presents the first option, the second option, and maybe other options. In some embodiments, the selected option of the handling settings 147 is input by a UI by the user 192 of the primary entity 193. An example of such a UI is now described.

Figure 2:
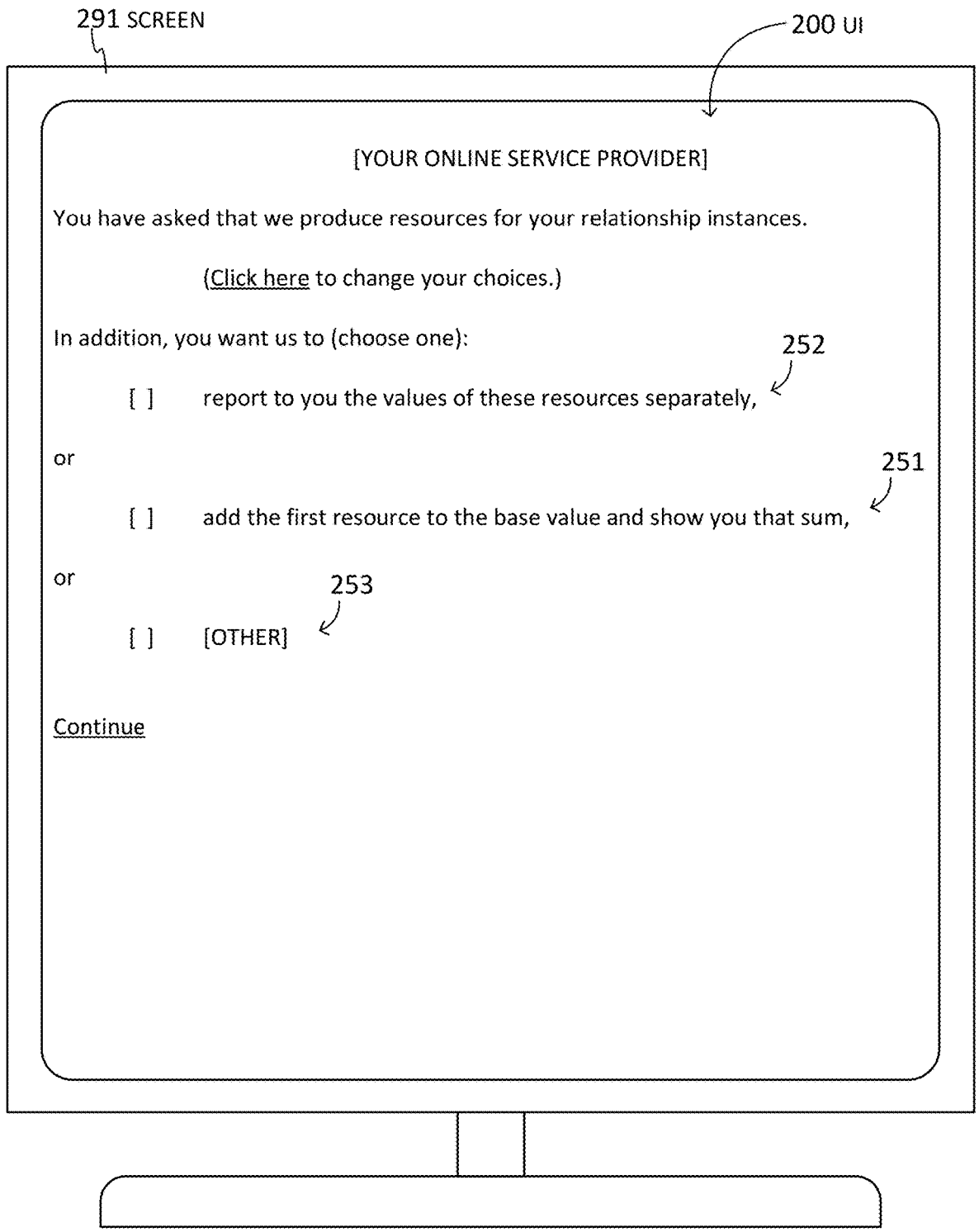
FIG. 2 is a sample view of a User Interface (UI) for inputting a selected of option of handling settings according to an embodiment.

FIG. 2 is a sample view of a User Interface (UI) 200, shown on a screen 291. The screen 291 could be the screen 191 of FIG. 1. The UI 200 can be used to input the selected option of the handling settings 147. In particular, the UI 200 presents options 251, 252, 253, for the user to select one. The option 251 is also known as the first option, and requires the certain summation. The option 252 is also known as the second option, and does not require the certain summation. In this example, there is also the option 253, which is yet different from the other two options.

Returning to FIG. 1, in embodiments, relationship instance data is input by the computer system 140. The relationship instance data can be of a relationship instance between a primary entity and a secondary entity, such as the relationship instance 197. At least some of the relationship instance data can be among the data 144. At least some of the relationship instance data can be ultimately received from another device, such as the device 132. The relationship instance data may include an attribute of one of the primary entity 193 and the secondary entity 196, and a base value for the relationship instance.

In embodiments, an outbound dataset 135 can be constructed by the computer system 140, from the input relationship instance data. A sample outbound dataset 135 is shown below the line 115.

The outbound dataset 135 may have parameters that can also be called dataset parameters. At least some of the dataset parameters have respective values that can also be called dataset values. The dataset values can be numerical, alphanumeric, Boolean, and so on, as needed for what the parameters characterize. For example, the value of an identity parameter ID may indicate an identity of the outbound dataset 135, so as to differentiate it from other such datasets.

At least a first one of the dataset values may characterize an attribute of one of the primary entity 193 and the secondary entity 196. For instance, a parameter D1 may have the value of a name of the primary entity 193 or of the secondary entity 196, a parameter D2 may have a value of relevant data of the entity, and so on.

At least a second one of the dataset values encodes the base value. For instance, a dataset parameter B1 may have a numerical base value. The base value B1 can be for an aspect of the dataset, and so on. The aspect of the dataset may be the aspect of a value that characterizes the attribute, an aspect of the reason that the dataset was created in the first place, an aspect of the relationship instance 197, and so on. The outbound dataset 135 may further have additional dataset parameters, as indicated by the horizontal dot-dot-dot on the right side of the outbound dataset 135. In embodiments, the dataset values characterize attributes of both the primary entity 193 and the secondary entity 196, but that is not required.

In embodiments, the outbound dataset 135 is caused, by the computer system 140, to be transmitted by the primary entity computer system 190 across a network to an OSP computer system that is distinct from the computer system 140. In the example of FIG. 1, the outbound dataset 135 is caused to be transmitted across the communications network 188 to the OSP computer system 195. The OSP computer system 195 is distinct from, not the same as, the computer system 140.

The outbound dataset 135 can be thus caused to be transmitted in a number of ways. In some embodiments, one or more requests may be transmitted by the computer system 140 via a network. In this example, a request 184 is thus transmitted via the communications network 188 by the computer system 140, when it is the same as the primary entity computer system 190. The requests can carry payloads. In this example, the request 184 carries a payload 134. In such embodiments, the one or more payloads may be parsed by the OSP computer system 195 to extract the outbound dataset 135. In this example the single payload 134 encodes the entire outbound dataset 135, but that is not required. In fact, a dataset can be received from the payloads of multiple requests. In such cases, a single payload may encode only a portion of the dataset. And, of course, the payload of a single request may encode multiple datasets. Additional computers may be involved with the communications network 188, some beyond the control of the user 192 or of the OSP 198, and some within such control.

As also mentioned above, in embodiments, the OSP computer system 195 is configured to produce a resource R1 179A and a resource R2 179B, in response to receiving the outbound dataset 135. An example is now described.

Figure 3:
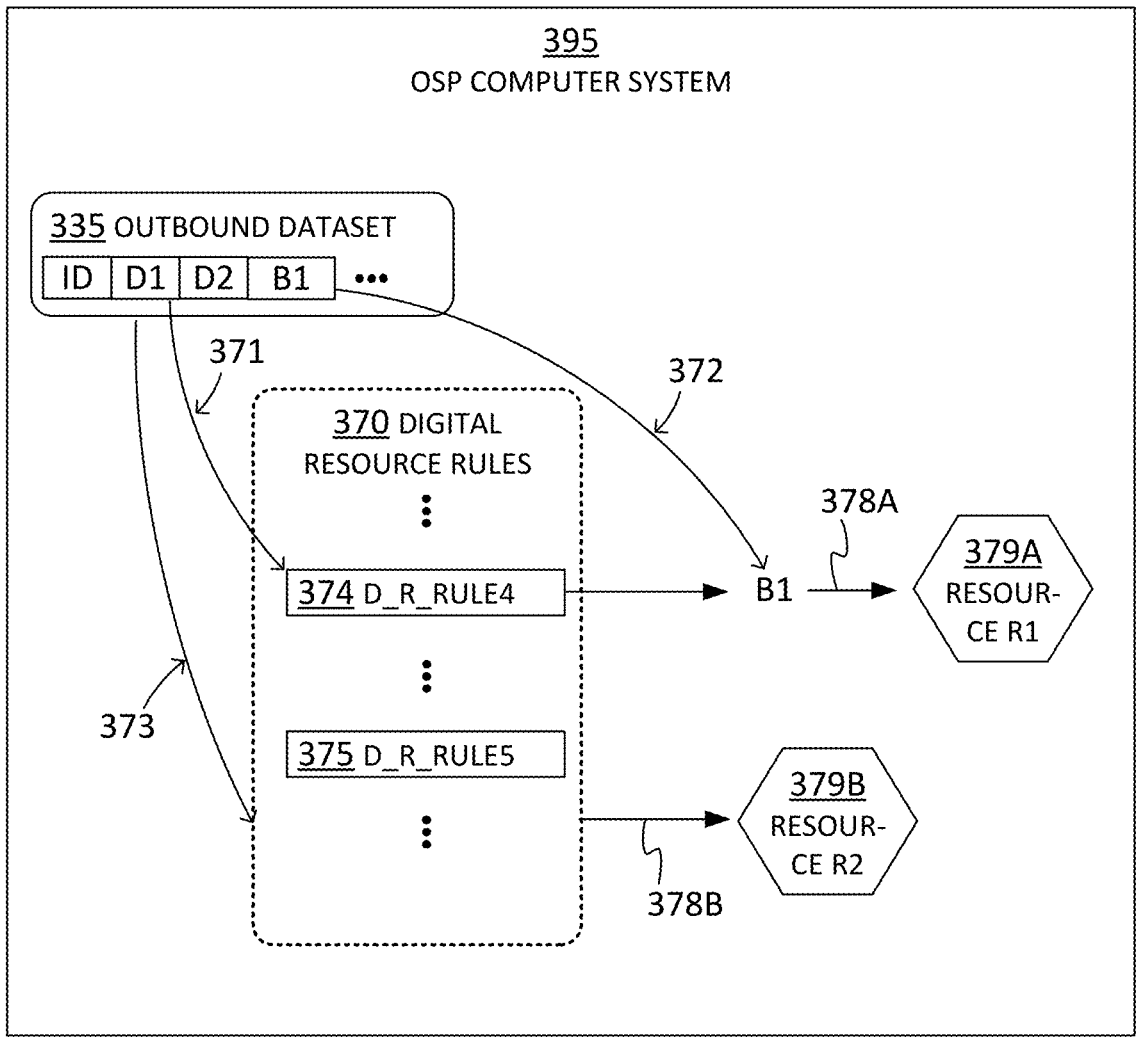
FIG. 3 is a diagram showing sample production of resources by an OSP computer system of FIG. 1, according to embodiments.

Referring now to FIG. 3, an OSP computer system 395 can be as the OSP computer system 195 of FIG. 1. In embodiments, a set 370 of digital resource rules is provided for use by the OSP computer system 395 and/or the OSP computer system 195. In the example of FIG. 3, only two sample digital resource rules of the set 370 are shown explicitly, namely rules D_R_RULE4 374 and D_R_RULE5 375, while other such rules are indicated by the vertical dot-dot-dots. The rules of the set 370 are digital in that they are implemented for use by software. For example, these rules may be implemented within programs and/or data of the OSP computer system 395 and/or the OSP computer system 195. The data portion of these rules may alternately be stored in memories, local or in other places that can be accessed by the OSP computer system 395. The storing can be in the form of a spreadsheet, a database, etc. One or more digital rules may be provided for a domain. Different sets of rules may be provided for different domains.

Still referring to FIG. 3, an outbound dataset 335 may have been received by the OSP computer system 395. The outbound dataset 335 can be as the outbound dataset 135. As mentioned above, a first dataset value D1 characterizes an attribute of the primary entity 193 or the secondary entity 196, and a second dataset value B1 encodes a base value for the relationship instance data.

In this example, the OSP computer system 395 is configured, in response to receiving the outbound dataset 335, to select, responsive to the first dataset value D1, a digital resource rule D_R_RULE4 374 from the set 370 of digital resource rules. The 395 is also configured to produce, by applying the selected digital resource rule D_R_RULE4 374 to the second dataset value B1, a first resource value R1 379A. As such, the first resource value R1 379A is shown as produced according to a selection arrow 371, an arrow 372 and a production arrow 378A. it will be observed that the selection arrow 371 starts from the value D1, and ends on the selected digital resource rule D_R_RULE4 374. The first resource value R1 379A can be different from the base value B1.

The OSP computer system 395 can be further configured to produce, according to at least one digital resource rule from the set 370 of digital resource rules, a second resource value R2 379B. The second resource value R2 379B is thus produced according to a selection arrow 373 and a production arrow 378B. The selection arrow 373 could use any of the dataset values of the outbound dataset 335, and could select any one of the rules in the set 370. As such, the selection arrow 373 does not start from any specific one of the dataset values, nor does it end on any specific one of the rules in the set 370. The second resource value R2 379B can be different from the first resource value 379A and from the base value B1.

In embodiments, the first resource value R1 379A and/or the second resource value R2 379B can be computational results, etc., made, created or prepared for the user 192, and/or the primary entity 193, and/or the secondary entity 196, etc. As such, in some embodiments, the resources are produced by processing and/or computations. For instance, the dataset value B1 can be a numerical base value. In such cases, applying the selected resource rule D_R_RULE4 374 may include performing a mathematical operation on the base value B1. For example, applying that rule may include multiplying the numerical base value B1 with a number indicated by that rule. Examples of small such numbers include 0.015, 0.03, 0.05, and so on, but the numbers need not be small or only positive. Such a number can be indicated directly by that rule, or be stored in a place indicated by the certain rule, or by the outbound dataset 135, and so on.

In some embodiments two or more digital main rules may be applied to produce the first resource value or the second resource value. For example, the OSP computer system 195 may select, responsive to one or more of the dataset values, another one of the accessed digital resource rules in the set 370. These one or more dataset values can be the same as, or different than, the one or more dataset values responsive to which the first selected rule was selected. In such embodiments, the resource value can be produced by the OSP computer system 195 also applying the other selected digital resource rule to at least one of the dataset values. For instance, where the base value B1 is used, applying the first selected rule may include multiplying the numerical base value B1 with a first number indicated by the first selected rule, so as to compute a first product. In addition, applying the second selected rule may include multiplying the numerical base value B1 with a second number indicated by the second selected rule, so as to compute a second product. And, a value of the resource may be produced by summing the first product and the second product.

Figure 4:
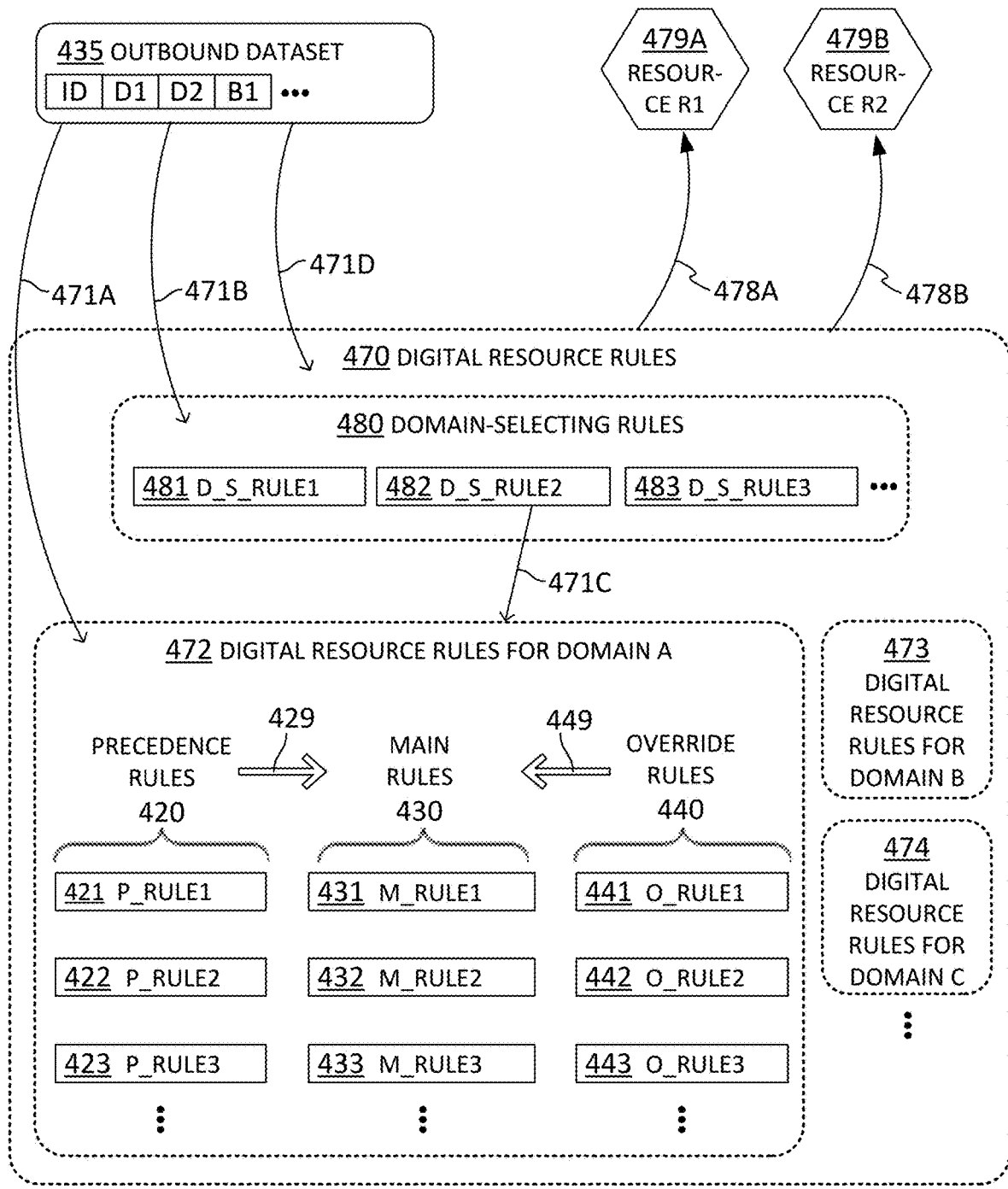
FIG. 4 is a diagram showing details and aspects of different types of possible embodiments of the digital resource rules of FIG. 3, which are improvements in automated computerized systems.

Referring now to FIG. 4, a sample outbound dataset 435 can be as described for the outbound datasets 135, 335. In addition, a set 470 of digital resource rules can be as the digital resource rules in the set 370 of FIG. 3. Similarly with FIG. 3, in FIG. 4 a resource value R1 479A can be produced according to an arrow 478A, and resource value R2 479B can be produced according to an arrow 478B.

The set 470 of digital resource rules includes different subsets, into which the individual rules belong. In addition, there can be hierarchical relationships among rules of different subsets, and/or of types. Often only one of these individual rules is eventually selected and applied, while one or more of them may have been used for selecting it. The certain rule that is eventually selected can be a rule in any one of subsets of the set 470 of digital resource rules, and none is shown as such in the example of FIG. 4.

In the example of FIG. 4, the set 470 includes a subset 480 of domain-selecting rules. The set 470 also includes subsets 472, 473, 474, . . . , each for digital resource rules for sample domains A, B, C, . . . respectively. A domain for which a subset of resource rules is thus provided could be associated with the primary entity 193 of FIG. 1, another domain could be associated with the secondary entity 196, or with pairings of them, and so on.

In many embodiments, one of the domain-selecting rules of the subset 480 can be used to select which domain's rules should be applied. Then the certain one of the digital resource rule(s) can be selected from the digital resource rules of the selected domain. Then the resource values 479A, 479B can be produced by used the selected certain digital resource rule(s).

In this example, the subset 480 of domain-selecting rules includes rules D_S_RULE1 481, D_S_RULE2 482, D_S_RULE3 483, . . . . One of these rules may be selected and used when more than one domain could be considered as eligible for its rules to apply. The rules of the subset 480, however, might not be necessary for embodiments where a single domain is considered or implied for one or more, or all of, the relationship instances. This can happen, for example, when it is known in advance that the primary entity 193 and every possible secondary entity are both associated with the same domain. Or, when it is planned that digital resource rules of only one domain will be considered, while any rules of any other domain will not be considered and will be disregarded.

Resource rules for individual domains are now described. Such rules need not be the same for each domain, or of the same type for each domain. The sample subset 472 of resource rules for domain A is now described in more detail. Its description can be similar for subsets for other domains, such as the subsets 473, 474, . . . .

The subset 472 of resource rules includes different types of rules. In this example, the subset 472 includes precedence rules 420, main rules 430, and override rules 440. In this example, the precedence rules 420 include rules P_RULE1 421, P_RULE2 422, P_RULE3 423, . . . . The main rules 430 include rules M_RULE1 431, M_RULE2 432, M_RULE3 433, . . . .

The override rules 440 include rules O_RULE1 441, O_RULE2 442, O_RULE3 443, . . . .

In embodiments, one of the main rules 430 may ordinarily be selected, which in FIG. 3 is shown as rule D_R_RULE4 374.

In this example, although not always required, the different types of rules within the subset 472 further have different hierarchies among them.

For a first instance, one of the precedence rules 420 may indicate which one of the main rules 430 is to be selected, as generally indicated by an arrow 429. Or, the one of the precedence rules 420 that does apply may itself be the eventually selected certain digital resource rule, instead of indicating any one of the main rules 430.

For a second instance, even when one of the main rules 430 is thus indicated, one of the override rules 440 may still override the indication, as generally indicated by an arrow 449. In such cases, the one of the rules 440 that overrides may be the eventually selected certain digital resource rule, instead of one of the main rules 430. Or, one of the rules 440 overrides by indicating yet a different one of the main rules 430 to be selected instead, and so on.

In FIG. 4, sample arrows 471A, 471B and 471D begin from the outbound dataset 435. These arrows suggest possible paths for the eventual selection of the digital resource rule(s) that will be used for ultimately producing the resource values 479A, 479B. These arrows are more detailed versions of the arrows 371, 372, 373 of FIG. 3. They are examples of possible arrows, and not all of them are necessarily used in every such determination.

According to the arrow 471A, the subset 472 is indicated. So, at least one of the rules of the subset 472 may initially be indicated as the certain rule, e.g. from one or more values of the parameters of the outbound dataset 435. The initially indicated rule can be the finally certain rule, or another intermediate rule which, in turn, will be used to select that certain rule.

According to the arrow 471B, at least one of the domain-selecting rules of the subset 480 may be invoked, from one or more values of the parameters of the outbound dataset 435.

According to an arrow 471C, the one of the rules of subset 480 that was invoked by the arrow 471B was the rule D_S_RULE2 482. And, the arrow 471C further indicates that the invoked rule points to the subset 472, instead of to the subsets 473, 474, . . . . As such, the subset 472 of resource rules should be used for selecting the certain rule. This example has the same result, but from a different path, as the sample arrow 471A.

The arrow 471D is drawn to indicate that one or more of the values of the parameters of the outbound dataset 435 are received and processed by the finally selected certain rule, similarly with the arrow 372.

Returning to FIG. 3, in the case of the arrow 371, the digital resource rule D_R_RULE4 374 may be selected in a number of ways. Examples are now described. It will be recognized that these examples from FIG. 3 are simple versions of the examples of FIG. 4, for easier comprehension.

In some embodiments, the OSP computer system 395 may identify, responsive to the characterized attribute of the first dataset value D1, a domain for the dataset. This identifying may be performed by one or more associations of the characterized attribute with domains, properties of domains, lists of what domains include, and so on. Sometimes the characterized attribute may even be the name of a domain, such as a component of a mailing address. The identified domain may be associated with the certain entity, which can be the primary entity 193 or the secondary entity 196.

In embodiments, the OSP computer system 395 may access the stored digital resource rules in the set 370, of the domain that was identified. This accessing may be performed responsive to the OSP computer system 395 receiving one or more datasets, such as the outbound dataset 335.

Then the OSP computer system 195 may select a certain one of the accessed digital resource rules in the set 370. In this example, the rule D_R_RULE4 374 is thus selected as the certain digital resource rule. The OSP computer system 195 may thus select the certain rule D_R_RULE4 374 responsive to one or more of the dataset values of the dataset parameters of the outbound dataset 335, as per the selection arrow 371. The selected rule may be associated with the identified domain.

In embodiments, some of the digital resource rules can be expressed in the form of a logical "if-then" statement, such as: "if P then Q". In such statements, the "if" part, represented by the "P", is called the condition, and the "then" part, represented by the "Q", is called the consequent. In some embodiments, the rules in the set 370 are implemented by simple rules. A simple rule has a single condition ("P"), and a single consequent ("Q").

As a result of an initial search, then, the digital resource rule D_R_RULE4 374 is selected, and then its consequent is applied to produce the resource.

In some embodiments, and as seen with reference to FIG. 4, the rules in the set 370 further include additional digital resource rules that select that digital resource rule D_R_RULE4 374 in the first place, for ultimately applying it. In such embodiments, the rules in the set 370 can be implemented as simple rules or as complex rules. Complex rules may have more than one conditions, and/or more than one consequents. Complex rules may be implemented as individual single rules with complex coding. Alternatively, a complex rule may be implemented in part by more than one simpler individual rules, which can have hierarchical relationships among them, e.g. from one rule's application or execution leading to another, and so on. As a result of the initial search, then, rules are found which, when applied, select that certain rule in the first place.

Figure 5:
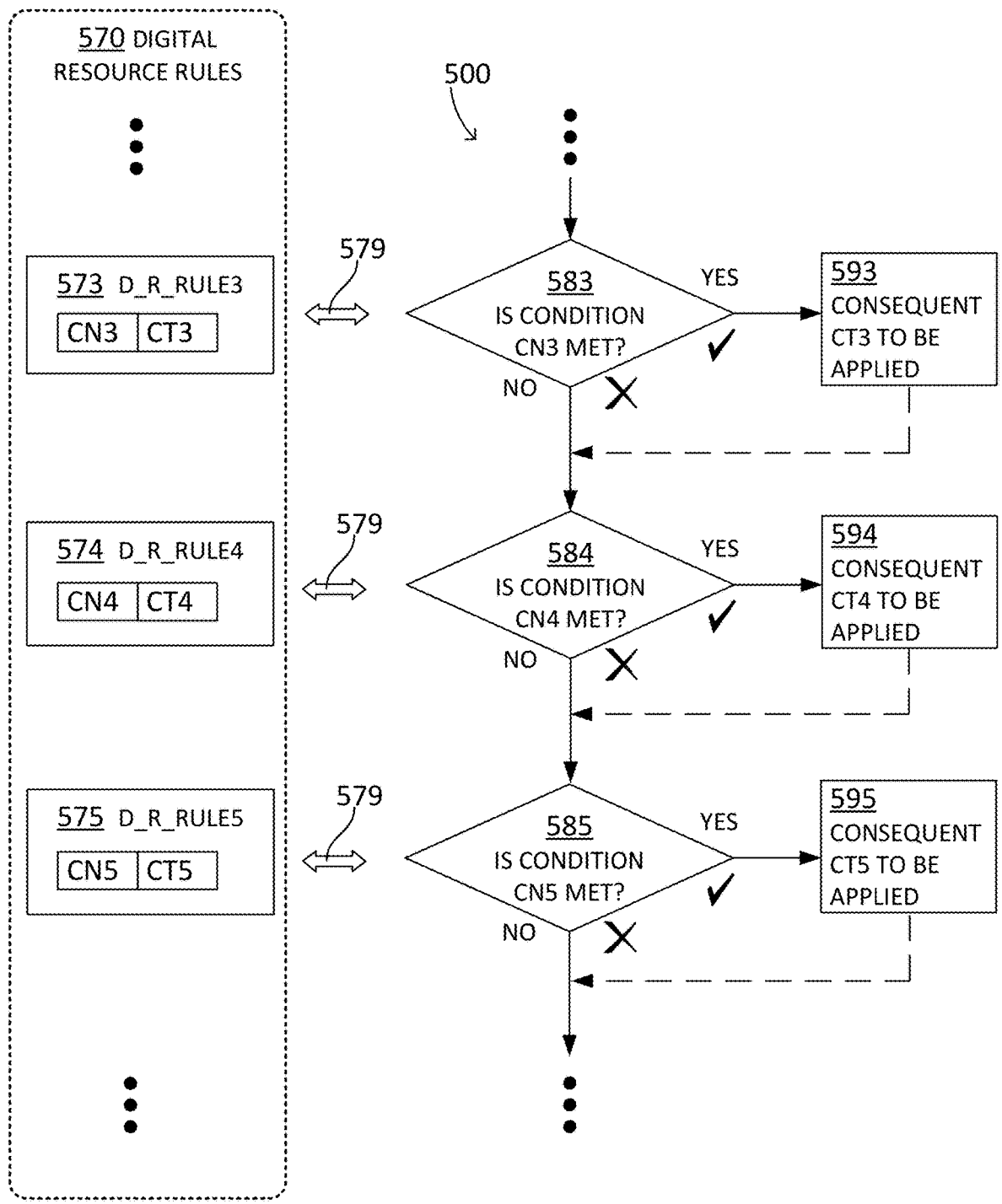
FIG. 5 is a diagram that shows sample digital resource rules such as those of FIG. 3 and/or of FIG. 4, and juxtaposes them with decision boxes of a flowchart portion of a sample method for recognizing that a condition of a certain digital resource rule can be met for its consequent to be applied, all according to embodiments of the present disclosure, which are improvements in automated computerized systems.

Any one of the above-described sets of rules may be searched iteratively. An example is now described. Referring now also to FIG. 5, a set 570 of digital resource rules are shown, which can be as the digital resource rules in the set 370 of FIG. 3 or in the set 470 of FIG. 4. The digital resource rules in the set 570 include the shown D_R_RULE3 573, D_R_RULE4 574 and D_R_RULE5 575, plus others according to the vertical dot-dot-dots.

Therefore, at least some of the digital resource rules include respective conditions and respective consequents that are associated with the respective conditions. And, for a certain digital main rule, if its certain condition P is met, then its certain consequent Q is what happens or becomes applied. In this example, the digital resource rules D_R_RULE3 573, D_R_RULE4 574, and D_R_RULE5 575, include respective conditions CN3, CN4, CN5. They also include consequents CT3, CT4, CT5 that are associated with the respective conditions CN3, CN4, CN5, respectively.

In addition, FIG. 5 shows a flowchart portion 500. In particular, individual ones of the digital resource rules in the set 570 are shown juxtaposed with individual ones of respective decision operations of the flowchart portion 500, according to two-way juxtaposition arrows 579.

In embodiments, therefore, the operation of identifying an applicable digital rule is performed by recognizing, by the OSP computer system 195, 395, that a certain condition of a certain one of the accessed digital resource rules is met by one or more of the dataset values. An example of such an operation is shown by the flowchart portion 500. In particular, according to successive decision operations 583, 584, 585, it is determined whether or not conditions CN3, CN4, CN5 are met by at least one of the values of a parameter of the dataset, respectively. If the answer to all is NO, then execution may proceed to the next decision operation. If the answer is YES then, according to operations 593, 594, 595, it is further determined that the respective consequents CT3, CT4, CT5 are to be applied. A consequent that is to be applied could be, for example, flagged as TRUE, executed on the spot, and so on. Then execution may proceed to the next decision operation in the flowchart portion 500 as is shown, or exit from it.

A number of examples are possible for how to recognize that a certain condition of a certain digital rule is met by at least one of the values of a parameter of the dataset. For instance, the certain condition could define a boundary of a region that is within a space. The region could be geometric, and even be within a larger space. For example, the region could be geographic, within the space of a city, a county, a state, a country, a continent or the earth. The boundary of the region could be defined in terms of numbers according to a coordinate system within the space. In the example of geography, the boundary could be defined in terms of groups of longitude and latitude coordinates. In such embodiments, the certain condition could be met responsive to the characterized attribute of the dataset being in the space and within the boundary of the region instead of outside the boundary. For instance, the attribute could be a location of the entity, and the one or more values of the parameters of the outbound dataset 335 that characterize the location could be one or more numbers or an address, or longitude and latitude. The condition can be met depending on how the one or more values compare with the boundary. For example, the comparison may reveal that the location is in the region instead of outside the region. The comparison can be made by rendering the characterized attribute in units comparable to those of the boundary. For example, the characterized attribute could be an address that is rendered into longitude and latitude coordinates, and so on.

Returning to FIG. 1, the OSP computer system 195 may be further configured to cause to be transmitted for receipt by the primary entity computer system 190, in response to receiving the outbound dataset 135, an inbound dataset 175. In particular, the OSP computer system 195 may cause the inbound dataset 175 to be communicated by being encoded as a payload 137, which is carried by a response 187. The response 187 may be transmitted via the communications network 188 responsive to the received request 184.

In the example to FIG. 1, the single payload 137 encodes the entire content of the inbound dataset 175, but that is not required. In fact, the content of the inbound dataset 175 instead may be provided via two or more payloads of two or more responses.

The inbound dataset 175 may encode the first resource value R1 179A and the second resource value R2 179B. The inbound dataset 175 is intended as a response to the outbound dataset 135, in order to inform the primary entity computer system 190 of the first resource value R1 179A and the second resource value R2 179B. As such, along with the first resource value R1 179A and the second resource value R2 179B, it can be advantageous to embed in the inbound dataset 175 the identity parameter (ID) and/or one or more parameters of the outbound dataset 135. This will help the recipient correlate the response 187 to the request 184, and therefore match these resource values as associated to the outbound dataset 135, for when the time comes.

In embodiments, therefore, the primary entity computer system 190 then receives, across the network 188, a dataset. In fact, it may receive multiple datasets, in response to having sent out multiple outbound datasets.

Then the primary entity computer system 190 may identify the received dataset as the aforementioned inbound dataset 175. The identification may happen in a number of ways. Examples are now described.

Referring to FIG. 6, a set 670 includes datasets 671, 672, 673, 674, 675, 676, 677. These may have been received by the primary entity computer system 190, in response to the outbound dataset 135. Of the datasets in the set 670, the dataset 675 is identified as the inbound dataset 675, because its ID parameter matches that of the outbound dataset 135.

Referring to FIG. 7, a received dataset 775 is identified as the inbound dataset 775 because it repeats also parameter values D1, D2, . . . of the outbound dataset 135. On the one hand, this technique permits using a shorter ID. Moreover, if the inbound dataset 775 repeats all the parameters of the outbound dataset 735, that makes it easier to process data on the side of the primary entity computer system 190, by enabling storing the data of a single relationship instance as a group without having to assemble them, and so on. On the other hand, relying on dataset parameters for such identification and matching includes unnecessary risks, in the event of similar or duplicate relationship instances having similar parameter values. As such, the arrangement of FIG. 7 is strongly not preferred for identification and matching, but the repeating of all the parameters may be used anyway for the benefits mentioned above.

Returning to FIG. 1, in embodiments, the computer system 140 may then input the first resource value R1 and the second resource value R2, which become known from the inbound dataset 175. The inputting may be performed responsive to the primary entity computer system 190 receiving the transmitted inbound dataset 175.

A pointer operation 150 is used to depict the options of the handling settings 147 in the example of FIG. 1. When a switch 159 points to the right as shown, the first option is selected, which requires the certain summation. The certain summation is to sum, i.e. add together, the base value B1 and the first resource value R1, but not summing with them the second resource value R2. This first option can be selected, for instance, by selecting the option 251 of the UI 200. However, when the switch 159 points to the left, a second option is selected that does not require the certain summation. This second option can be selected by selecting the option 252 of the UI 200.

In embodiments, therefore, the computer system 140, according to the certain summation may sum the base value B1 and the first resource value R1 but not the second resource value R2, responsive to the first option being the selected option of the handling settings 147. The summing will produce a summed value (B1+R1) 173. The computer system 140 may then cause the summed value 173 to be forwarded to an output device. In practice, and as can be seen in FIG. 1, both the summed value 173 and the second resource value R2 172 may be thus forwarded, perhaps as a group.

Else, responsive to the second option being the selected option of the handling settings 147, the computer system 140 may cause the first resource value R1 and the second resource value R2 to be forwarded to the output device. In FIG. 1, the first resource value R1 171 is seen thus grouped with the second resource value R2 172.

In embodiments, the output device is a screen, a printer and so on. For instance, the output device can be a part of the computer system 140. Or, the output device can be a part of a computer system other than the computer system 140. The output device can be the screen 191, the screen 133, and so on. An example is now described, where the output device is a screen.

FIG. 8 repeats salient elements of FIG. 1, but with specific values. In particular, an outbound dataset 835 can be the outbound dataset 135. The base value B1 is 100, while its units are known by convention or are also communicated. An inbound dataset 875 has been identified and matched. The first resource value R1 is 5.2 and the second resource value R2 is 0.45. A pointer operation 850 has a switch 859 that points to the right, and which therefore indicates that the selected option of the handling settings (not shown) requires the certain summation of FIG. 1.

A screen 891 is the output device, and displays a User Interface (UI) 800. The UI 800 shows the summed value 873, which arises from 100+5.2=105.20. The UI 800 shows the second resource value 872. The UI 800 further shows appropriate headings over the values 873, 872.

FIG. 9 shows a flowchart 900 for describing methods according to the first embodiments, whose operations may be performed by the computer system 140. According to an operation 910, a selected one of options of handling settings may be input by a computer system. The first one of the options may require a certain summation of values in datasets, and a second one of the options may not require the certain summation.

According to another operation 920, relationship instance data may be input by a computer system. The relationship instance data can be of a relationship instance between a primary entity and a secondary entity. In particular, the relationship instance data may include an attribute of one of the primary entity and the secondary entity, and a base value for the relationship instance.

According to another operation 930, an outbound dataset may be constructed by the computer system, and from the input relationship instance data. The outbound dataset may have dataset parameters. At least some of the dataset parameters may have respective dataset values. At least a first one of the dataset values may characterize the attribute of the operation 920. At least a second one of the dataset values may encode the base value.

According to another operation 940, the outbound dataset can be caused to be transmitted by a primary entity computer system across a network to an Online Software Platform (OSP) computer system that is distinct from the computer system. The OSP computer system can be configured, in response to receiving the outbound dataset, to select, responsive to the first dataset value, a digital resource rule from a set of digital resource rules and to produce, by applying the selected digital resource rule to the second dataset value, a first resource value different from the base value. The OSP computer system can be further configured to produce, according to at least one digital resource rule of the set digital resource rules, a second resource value different from the first resource value and from the base value. The second resource value may be thus produced from a digital resource rule different than the one from which the first resource value was produced. The OSP computer system can be further configured to cause to be transmitted for receipt by the primary entity computer system, in response to receiving the outbound dataset, an inbound dataset encoding the first resource value and the second resource value.

According to another operation 950, the first resource value and the second resource value may be input from the inbound dataset. The inputting may be performed by the computer system, and responsive to the primary entity computer system receiving the transmitted inbound dataset.

According to another operation 959, it is inquired whether a certain summation is required, for instance as shown by the switch 159 of FIG. 1.

If at the operation 959 the answer is YES, then this means that the first option is the selected option of the handling settings. Responsive to that, according to another operation 982, the base value and the first resource value but not the second resource value may be summed by the computer system. The summing produces a summed value. Then, according to another operation 984, the summed value may be caused by the computer system to be forwarded to an output device. In addition, the second resource may also be caused to be forwarded to the output device.

Else, if at the operation 959 the answer is NO, then this means that the second option is the selected option of the handling settings. Responsive to that, according to another operation 994, the first resource value and the second resource value may be caused by the computer system to be forwarded to the output device.

Second Embodiments

FIG. 10 is a diagram showing sample aspects of first embodiments. it will be recognized that many elements of FIG. 10 are identical, parallel and/or just similar to those of FIG. 1. Accordingly, some portions of detailed descriptions that apply from the first embodiments are not repeated in this part.

A thick horizontal line 1015 separates this diagram, although not completely or rigorously. Above the line 1015, a sample OSP computer system 1095 according to embodiments can be located in "the cloud", and may optionally be implemented as part of an Online Software Platform (OSP) 1098. The OSP computer system 1095 can be configured to perform one or more predefined services. As such, the OSP 1098 can be an online service provider. In embodiments, the OSP computer system 1095 is configured to produce a resource value R1 1079A, a resource value R2 1079B, and optionally additional resources.

A user 1092 may be as the user 192. The user 1092 may use a primary entity computer system 1090 that has a screen 1091, on which User Interfaces (UIs) may be shown. In embodiments, the user 1092 and the primary entity computer system 1090 are considered part of a primary entity 1093, which can be as the primary entity 193. In such instances, the user 1092 can be an agent of the primary entity 1093, and so on.

The primary entity computer system 1090 may access the OSP computer system 1095 via a communications network 1088, which can be as the communications network 188. Moreover, in some embodiments, data from the primary entity computer system 1090 and/or from the OSP computer system 1095 may be stored in an Online Processing Facility (OPF) 1089 that can be as the OPF 189.

In embodiments, the user 1092 and/or the primary entity 1093 have instances of relationships with secondary entities. Only one such secondary entity 1096 is shown, and can be as the secondary entity 196. In some embodiments, the secondary entity 1096 has a device 1032, that may have a screen 1033, similarly with the device 132. In this example, the primary entity 1093 has a relationship instance 1097 with the secondary entity 1096, which can be similar to the relationship instance 197.

Below the line 1015, a computer system 1040 is shown. In some embodiments, the computer system 1040 is the OSP computer system 1095. In other embodiments, the computer system 1040 is controlled by the OSP 1098, and could be in the cloud, communicating with the OSP computer system 1095. For instance, in such embodiments, the computer system 1040 could be in the OPF 1089. In all of these cases, however, the primary entity 1093 has access to the computer system 1040, for inputting handling settings 1047.

The computer system 1040 has one or more processors 1041 and a memory 1042. The memory 1042, which is a non-transitory computer-readable medium, is configured to store programs 1043 and data 1044. The programs 1043 may include instructions that can be executed by the one or more processors 1041, all similarly with analogous elements of FIG. 1.

Similarly with FIG. 1, handling settings 1047 may reside in the memory 1042. The handling settings 1047 may be some of the programs 1043 and the data 1044. The handling settings 1047 may be part of an optional connector 1048. In embodiments, the handling settings 1047 are input by the computer system 1040. In some of these embodiments, the handling settings 1047 are thus input via a user interface (UI), similarly as described for the handling settings 147 and FIG. 2.

In embodiments a base value B1, a first resource value R1 1079A and a second resource value R2 1079B are input by the computer system 1040. Before this operation, a number of other operations may have already taken place.

In particular, the inputting can be performed responsive to the OSP computer system 1095 receiving an outbound dataset 1035 via the network 1088 from the primary entity computer system 1090. The outbound dataset 1035 can be as was described for the outbound dataset 135. The outbound dataset 1035 may have been received via a request 1084 that has a payload 1034.

The base value B1 may be learned from the outbound dataset 1035, even directly. The first resource value R1 1079A and the second resource value R2 1079B may have been produced according to digital rules by the OSP computer system 1095, similarly to what was described for the first resource value R1 179A and the second resource value R2 179B.

Similarly with FIG. 1, a pointer operation 1050 is used to depict the options of the handling settings 1047 in the example of FIG. 10. When a switch 1059 points to the right as shown, a first option is selected, which requires a certain summation. The certain summation is to sum, i.e. add together, the base value B1 and the first resource value R1, but not summing with them the second resource value R2. This first option can be selected, for instance, by selecting the option 251 of the UI 200. However, when the switch 1059 points to the left, a second option is selected that does not require the certain summation. This second option can be selected by selecting the option 252 of the UI 200.

An inbound dataset can then be caused to be transmitted by the OSP computer system 1095 across the communications network 1088 to the primary entity computer system 1090. The contents of the inbound dataset may depend on the handling settings 1047. It should be remembered that, in some embodiments, the computer system 1040 where the handling settings 1047 are stored and implemented is itself the OSP computer system 1095.

In embodiments, therefore, the computer system 1040, according to the certain summation, may sum the base value B1 and the first resource value R1 but not the second resource value R2, responsive to the first option being the selected option of the handling settings 1047. The summing will produce a summed value (B1+R1) 1073. In such instances, an inbound dataset 1075B can then be caused to be transmitted by the OSP computer system 1095 across the communications network 1088 to the primary entity computer system 1090. The inbound dataset 1075B may encode the summed value (B1+R1) 1073, responsive to the first option being the selected option of the handling settings 1047. In the example of FIG. 10, the inbound dataset 1075B also encodes the second resource value R2 1072.

Else, responsive to the second option being the selected option of the handling settings 1047, an inbound dataset 1075A can then be caused to be transmitted, by the OSP computer system 1095, across the communications network 1088 to the primary entity computer system 1090. The inbound dataset 1075A may encode the first resource value R1 1071 and the second resource value R2 1072.

In either case, the OSP computer system 1095 may cause the inbound dataset 1075A or 1075B to be communicated by being encoded as a payload 1037, which is carried by a response 1087. The response 1087 may be transmitted via the communications network 1088 responsive to the received request 1084.

FIG. 11 shows a flowchart 1100 for describing methods according to the second embodiments, whose operations may be performed by the computer system 1040, except where stated otherwise. According to an operation 1110, a selected one of options of handling settings may be input by a computer system. The first one of the options may require a certain summation of values in datasets, and a second one of the options may not require the certain summation.

According to another operation 1150, a base value, a first resource value and a second resource value may be input. Inputting may be performed responsive to an Online Software Platform (OSP) computer system receiving an outbound dataset via a network from a primary entity computer system. The primary entity computer system can be distinct from the OSP computer system and from the computer system.

In embodiments, the outbound dataset has dataset parameters. At least some of the dataset parameters have respective dataset values. At least some of the dataset values represent relationship instance data of a relationship instance between a primary entity and a secondary entity. At least a first one of the dataset values may characterize an attribute of one of the primary entity and the secondary entity, and at least a second one of the dataset values may encoding the base value, which can be for the relationship instance.

In such embodiments, the OSP computer system can be configured to select, responsive to the first dataset value, a digital resource rule from a set of digital resource rules, and to produce, by applying the selected digital resource rule to the second dataset value, the first resource value. The first resource value can be different from the base value. The OSP computer system can be further configured to produce, according to at least one digital resource rule of the set of the digital resource rules. The second resource value can be different from the first resource value and from the base value.

According to another operation 1159, it is inquired whether a certain summation is required, for instance as shown by the switch 1059 of FIG. 10.

If at the operation 1159 the answer is YES, then this means that the first option is the selected option of the handling settings. Responsive to that, according to another operation 1182, the base value and the first resource value but not the second resource value may be summed by the computer system. The summing produces a summed value. Then, according to another operation 1184, an inbound dataset is caused, by the OSP computer system, to be transmitted from the OSP computer system across a network to the primary entity computer system. The inbound dataset may encode the summed value. Optionally it may also encode the second resource value.

Else, if at the operation 1159 the answer is NO, then this means that the second option is the selected option of the handling settings. Responsive to that, according to another operation 1194, an inbound dataset is caused, by the OSP computer system, to be transmitted from the OSP computer system across a network to the primary entity computer system. The inbound dataset may encode the first resource value and the second resource value.

Details about Computer Systems

Figure 12:
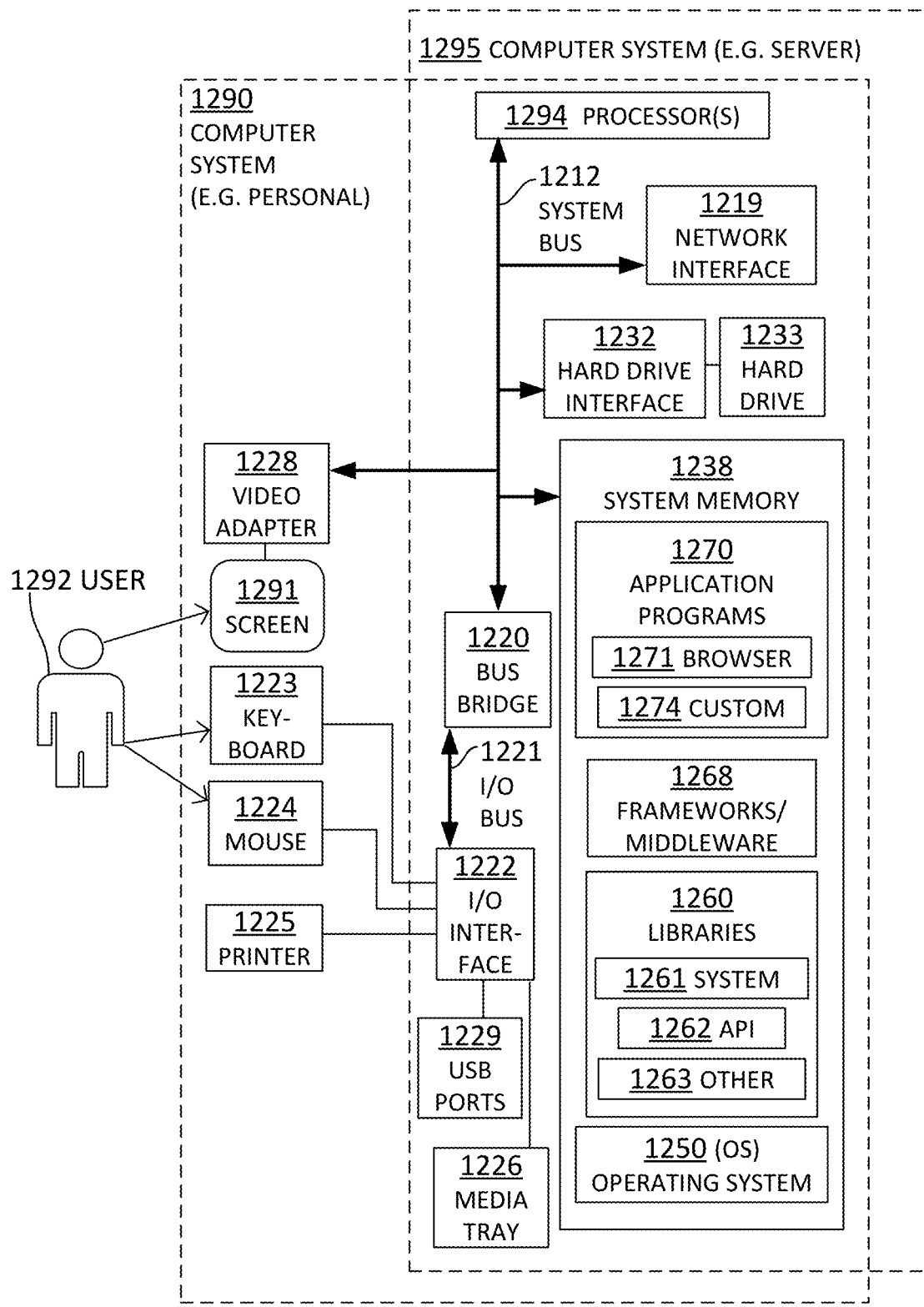
FIG. 12 is a block diagram showing additional components of sample computer systems according to embodiments, which are improvements in automated computerized systems.

FIG. 12 shows details for a sample computer system 1295 and for a sample computer system 1290. The computer system 1295 may be a server, while the computer system 1290 may be a personal device, such as a personal computer, a desktop computer, a personal computing device such as a laptop computer, a tablet computer, a mobile phone, and so on. Either type may be used for the OSP computer system 195 and the primary entity computer system 190 of FIG. 1, and/or a computer system that is part of the OPF 189. Either type may be operated by a user 1292, who can be as other users described in this document.

The computer system 1295 and the computer system 1290 have similarities, which FIG. 12 exploits for purposes of economy in this document. It will be understood, however, that a component in the computer system 1295 may be implemented differently than the same component in the computer system 1290. For instance, a memory in a server may be larger than a memory in a personal computer, and so on. Similarly, custom application programs 1274 that implement embodiments may be different, and so on.

The computer system 1295 includes one or more processors 1294. The processor(s) 1294 are one or more physical circuits that manipulate physical quantities representing data values. The manipulation can be according to control signals, which can be known as commands, op codes, machine code, etc. The manipulation can produce corresponding output signals that are applied to operate a machine. As such, the one or more processors 1294 may, for example, include a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

A hardware component such as a processor may also include programmable logic or circuitry that is temporarily configured by software to perform certain operations. For example, a hardware component may include software executed by a general-purpose processor or another type of programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, Application Programming Interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable storage medium) or hardware components. The hardware components depicted in the computer system 1295, or the computer system 1290, are not intended to be exhaustive. Rather, they are representative, for highlighting essential components that can be used with embodiments.

The computer system 1295 also includes a system bus 1212 that is coupled to the processor(s) 1294. The system bus 1212 can be used by the processor(s) 1294 to control and/or communicate with other components of the computer system 1295.

The computer system 1295 additionally includes a network interface 1219 that is coupled to system bus 1212. Network interface 1219 can be used to access a communications network, such as the communications network 188. Network interface 1219 can be implemented by a hardware network interface, such as a Network Interface Card (NIC), wireless communication components, cellular communication components, Near Field Communication (NFC) components, Bluetooth® components such as Bluetooth® Low Energy, Wi-Fi® components, etc. Of course, such a hardware network interface may have its own software, and so on.

The computer system 1295 also includes various memory components. These memory components include memory components shown separately in the computer system 1295, plus cache memory within the processor(s) 1294. Accordingly, these memory components are examples of non-transitory machine-readable media. The memory components shown separately in the computer system 1295 are variously coupled, directly or indirectly, with the processor(s) 1294. The coupling in this example is via the system bus 1212.

In this context, "machine-readable storage medium" refers to a component, device or other tangible media able to store instructions and data temporarily or permanently and may include, but is not be limited to, a portable computer diskette, a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable compact disc read-only memory (CD-ROM), an optical storage device, a magnetic storage device, or any suitable combination of the foregoing. The machine that would read such a medium can be a computer system that includes the one or more processors 1294.

Instructions for performing any of the methods or functions described in this document may be stored, completely or partially, within the memory components of the computer system 1295, etc. The storing of such instructions can be such that one or more processors of a computer system can store, erase, read, or execute them. As such the instructions, when executed by the one or more processors, are designed to or programmed to cause the computer system to perform any one or more of the operations of the methods described herein.

The instructions may be implemented by computer program code for carrying out operations for aspects of this document. The computer program code may be written in any combination of one or more programming languages, including an object-oriented programming language such as Java, Smalltalk or the like, and/or conventional procedural programming languages, such as the "C" programming language or similar programming languages such as C++, C Sharp, Python, etc. Accordingly, such instructions transform a general, non-programmed machine into a particular machine programmed to carry out the described and illustrated functions in the manner described.

The memory components of the computer system 1295 include a non-volatile hard drive 1233. The computer system 1295 further includes a hard drive interface 1232 that is coupled to the hard drive 1233 and to the system bus 1212.

The memory components of the computer system 1295 include a system memory 1238. The system memory 1238 includes volatile memory including, but not limited to, cache memory, registers and buffers. In embodiments, data from the hard drive 1233 populates registers of the volatile memory of the system memory 1238.

In some embodiments, the system memory 1238 has a software architecture that uses a stack of layers, with each layer providing a particular functionality. In this example the layers include, starting from the bottom, an Operating System (OS) 1250, libraries 1260, frameworks/middleware 1268 and application programs 1270, which are also known more simply as applications 1270. Other software architectures may include less, more or different layers. For example, a presentation layer may also be included. For another example, some mobile or special purpose operating systems may not provide a frameworks/middleware 1268.

The OS 1250 may manage hardware resources and provide common services. The libraries 1260 provide a common infrastructure that is used by the applications 1270 and/or other components and/or layers. The libraries 1260 provide functionality that allows other software components to perform tasks more easily than if they interfaced directly with the specific underlying functionality of the OS 1250. The libraries 1260 may include system libraries 1261, such as a C standard library. The system libraries 1261 may provide functions such as memory allocation functions, string manipulation functions, mathematical functions, and the like.

In addition, the libraries 1260 may include API libraries 1262 and other libraries 1263. The API libraries 1262 may include media libraries, such as libraries to support presentation and manipulation of various media formats such as MPREG4, H.264, MP3, AAC, AMR, JPG, and PNG. The API libraries 1262 may also include graphics libraries, for instance an OpenGL framework that may be used to render 2D and 3D in a graphic content on the screen 1291. The API libraries 1262 may further include database libraries, for instance SQLite, which may support various relational database functions. The API libraries 1262 may additionally include web libraries, for instance WebKit, which may support web browsing functionality, and also libraries for the applications 1270.

The frameworks/middleware 1268 may provide a higher-level common infrastructure that may be used by the applications 1270 and/or other software components/modules. For example, the frameworks/middleware 1268 may provide various Graphic User Interface (GUI) functions, high-level resource management, high-level location services, and so forth. The frameworks/middleware 1268 may provide a broad spectrum of other APIs that may be used by the applications 1270 and/or other software components/modules, some of which may be specific to the OS 1250 or to a platform.

The application programs 1270 are also known more simply as applications and apps. One such app is a browser 1271, which is a software that can permit the user 1292 to access other devices in the internet, for example while using a Graphic User Interface (GUI). The browser 1271 includes program modules and instructions that enable the computer system 1295 to exchange network messages with a network, for example using Hypertext Transfer Protocol (HTTP) messaging.

The application programs 1270 may include one or more of the aforementioned custom application programs 1274, made according to embodiments. These can be made so as to cause their host computer to perform operations according to embodiments. Of course, when implemented by software, operations according to embodiments may be implemented much faster than may be implemented by a human mind; for example, tens or hundreds of such operations may be performed per second according to embodiments, which is much faster than a human mind can do.

Other such applications 1270 may include a contacts application, a book reader application, a location application, a media application, a messaging application, and so on. Applications 1270 may be developed using the ANDROID™ or JOS™ Software Development Kit (SDK) by an entity other than the vendor of the particular platform, and may be mobile software running on a mobile operating system. The applications 1270 may use built-in functions of the OS 1250, of the libraries 1260, and of the frameworks/middleware 1268 to create user interfaces for the user 1292 to interact with.

The computer system 1295 moreover includes a bus bridge 1220 coupled to the system bus 1212. The computer system 1295 furthermore includes an input/output (I/O) bus 1221 coupled to the bus bridge 1220. The computer system 1295 also includes an I/O interface 1222 coupled to the I/O bus 1221.

For being accessed, the computer system 1295 also includes one or more Universal Serial Bus (USB) ports 1229. These can be coupled to the I/O interface 1222. The computer system 1295 further includes a media tray 1226, which may include storage devices such as CD-ROM drives, multi-media interfaces, and so on.

The computer system 1290 may include many components similar to those of the computer system 1295, as seen in FIG. 12. In addition, a number of the application programs may be more suitable for the computer system 1290 than for the computer system 1295.

The computer system 1290 further includes peripheral input/output (I/O) devices for being accessed by a user more routinely. As such, the computer system 1290 includes a screen 1291 and a video adapter 1228 to drive and/or support the screen 1291. The video adapter 1228 is coupled to the system bus 1212.

The computer system 1290 also includes a keyboard 1223, a mouse 1224, and a printer 1225. In this example, the keyboard 1223, the mouse 1224, and the printer 1225 are directly coupled to the I/O interface 1222. Sometimes this coupling is via the USB ports 1229.

A computer readable signal traveling from, to, and via these components may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Operational Examples—Use Cases

The above-mentioned embodiments have one or more uses. Aspects presented below may be implemented as was described above for similar aspects. Some, but not all of these aspects even have reference numerals that are similar to the above, to facilitate comprehension.

Operational examples and sample use cases are now described with reference only to the first embodiments of FIG. 1. They could, of course, be implemented using instead the second embodiments of FIG. 10.

Figure 13:
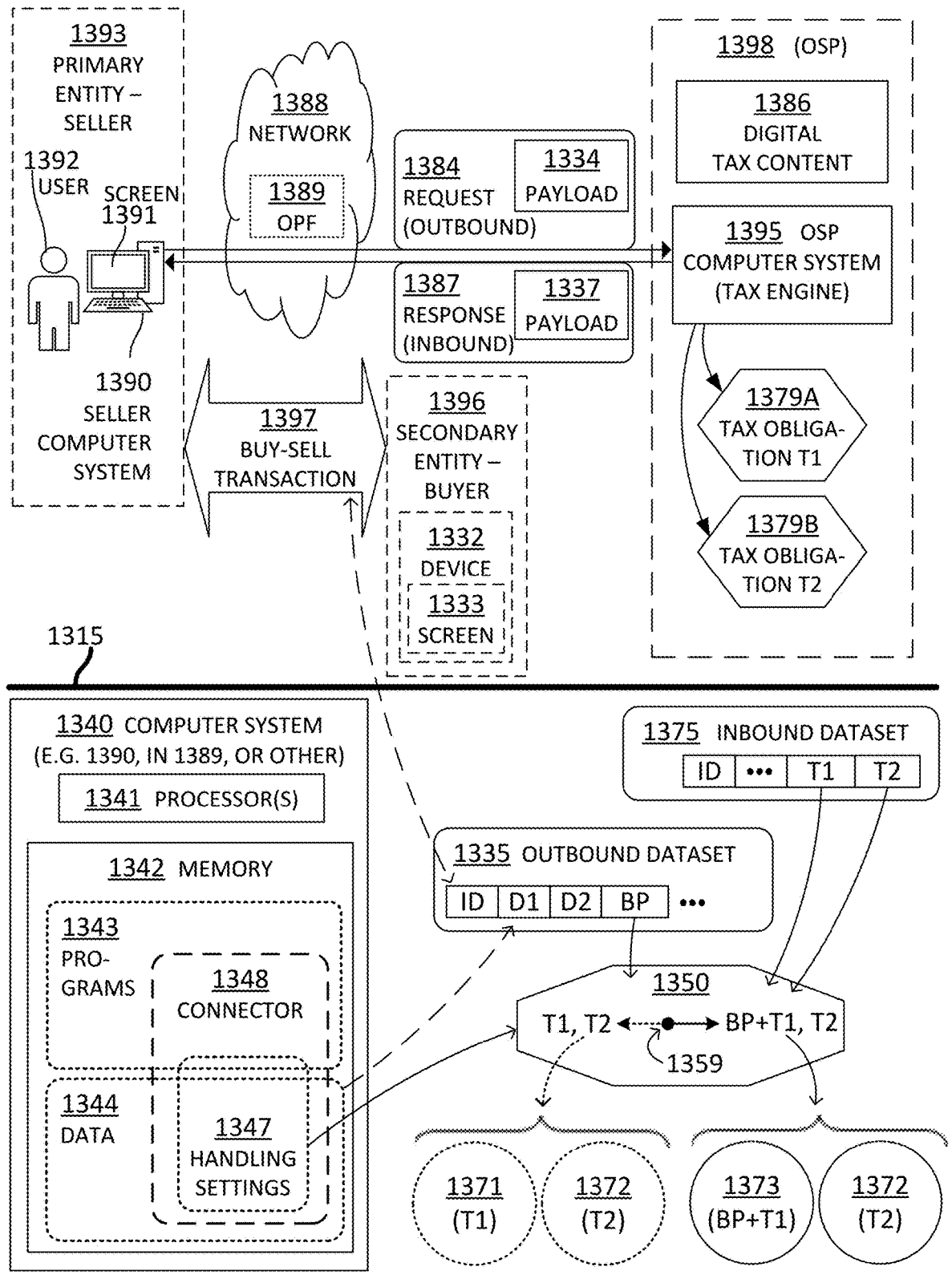
FIG. 13 is a diagram of sample aspects for describing operational examples and use cases of embodiments.

FIG. 13 is a diagram for an operational example where a buy-sell transaction 1397 is a use case of the relationship instance 197. The transaction 1397 is conducted between a primary entity 1393, which is a seller, and a secondary entity 1396, which is a buyer. The transaction 1397 is therefore a buy-sell transaction between them, for instance for a physical item, but it could be a non-physical item such as a digital item, a specific right, and so on.

In this case, two tax obligations 1379A, 1379B arise from the transaction 1397. One of them could be a sales and/or use tax, and which depends on the base price. The other one can be called a certain type of a tax, a fee, an assessment, a surcharge and so on. Both the tax obligations 1379A, 1379B must be paid by either the primary entity 1393 or the secondary entity 1396 or shared in combination. A computation of the values of these tax obligations 1379A, 1379B is a use case of producing the values of the resources 179A, 179B. As such, these operational examples and sample use cases are possible at least where the attribute of an entity in a dataset is any one of the entity's name, type of entity, a physical location such as an address, a contact information element, an affiliation, a characterization of another entity, a characterization by another entity, an association or relationship with another entity (general or specific instances), an asset of the entity, a declaration by or on behalf of the entity, and so on. Different resources may be produced in such instances, and so on.

It will be recognized that aspects of FIG. 13 have similarities with aspects of FIG. 1. Portions of such aspects may be implemented as described for analogous aspects of FIG. 1. In particular, a thick horizontal line 1315 separates FIG. 13, although not completely or rigorously. Above the line 1315 are shown elements with more emphasis on entities, components, their relationships, and their interactions, while below the line 1315 are shown elements with more emphasis on where certain elements reside, and on processing of data that takes place often within one or more of the components that are shown above the line 1315.

Above the line 1315, an OSP computer system 1395 is shown, which is used to help customers, such as a user 1392, with tax compliance. For instance, the user 1392 may log into the OSP computer system 1395 by using credentials, such as a user name, a password, a token, and so on. Further in this example, the OSP computer system 1395 is part of an OSP 1398 that is implemented as a Software as a Service (SaaS) provider, for being accessed by the user 1392 online. As such, the OSP 1398 can be an online service provider for clients. Alternately, the functionality of the OSP computer system 1395 may be provided locally to a user.

The user 1392 may be standalone. The user 1392 may use a seller computer system 1390 that has a screen 1391. In embodiments, the user 1392 and the seller computer system 1390 are considered part of the primary entity 1393, which is also known as entity 1393. The primary entity 1393 can be a business, such as a seller of items, a reseller, a buyer, a service business, and so on. In such instances, the user 1392 can be an employee, a contractor, or otherwise an agent of the entity 1393.

The buyer 1396 can be an organization, a person, and so on. The buyer 1396 has a device 1332 with a screen 1333. The buyer 1396 may have used a device such as the device 1332 for the buy-sell transaction 1397.

The buy-sell transaction 1397 may involve an operation, such as an exchange of data to form an agreement. This operation can be performed in person, or over a network 1388, which can be as described elsewhere for communications networks, etc. In such cases the entity 1393 can even be an online seller, but that is not necessary. The transaction 1397 will have data that is known to the entity 1393, similarly with what was described by the relationship instance 197 of FIG. 1.

In a number of instances, the user 1392 and/or the entity 1393 use software applications to manage their business activities, such as sales, resource management, production, inventory management, delivery, billing, and so on. The user 1392 and/or the entity 1393 may further use accounting applications to manage purchase orders, sales invoices, refunds, payroll, accounts payable, accounts receivable, and so on. Such software applications, and more, may be used locally by the user 1392, or from an Online Processing Facility (OPF) 1389 that has been engaged for this purpose by the user 1392 and/or the entity 1393. The OPF 1389 can be analogous to the OPF 189. In such use cases, the OPF 1389 can be a Mobile Payments system, a Point Of Sale (POS) system, an Accounting application, an Enterprise Resource Planning (ERP) provider, an e-commerce provider, an electronic marketplace, a Customer Relationship Management (CRM) system, and so on.

Businesses have tax obligations to various tax authorities of respective tax jurisdictions. It is often challenging to even determine what taxes are owed and to whom, because the underlying statutes and tax rules and guidance issued by the tax authorities are very complex. There are various types of tax, such as sales tax, use tax, excise tax, value-added tax, and issues about cross-border taxation including customs and duties, and many more. Some types of tax are industry specific. Each type of tax has its own set of rules. Additionally, statutes, tax rules, and rates change often, and new tax rules are continuously added. Compliance becomes further complicated when a taxing authority offers a temporary tax holiday, during which certain taxes are waived.

Tax jurisdictions are defined mainly by geography. Businesses have tax obligations to various tax authorities within the respective tax jurisdictions. There are various tax authorities, such as that of a group of countries, of a single country, of a state, of a county, of a municipality, of a city, of a local district such as a local transit district and so on. So, for example, when a business sells items in transactions that can be taxed by a tax authority, the business may have the tax obligations to the tax authority. These obligations include requiring the business to: a) register itself with the tax authority's taxing agency, b) set up internal processes for collecting sales tax in accordance with the sales tax rules of the tax authority, c) maintain records of the sales transactions and of the collected sales tax in the event of a subsequent audit by the taxing agency, d) periodically prepare a form ("tax return") that includes an accurate determination of the amount of the money owed to the tax authority as sales tax based on the sales transactions, e) file the tax return with the tax authority by a deadline determined by the tax authority, and f) pay ("remit") that amount of money to the tax authority. In such cases, the filing and payment frequency and deadlines are determined by the tax authority.

A challenge for businesses is that the above-mentioned software applications generally cannot provide tax information that is accurate enough for the businesses to be tax compliant with all the relevant tax authorities. The lack of accuracy may manifest itself as errors in the amounts determined to be owed as taxes to the various tax authorities, and it is plain not good to have such errors. For example, businesses that sell products and services have risks whether they over-estimate or under-estimate the sales tax due from a sale transaction. On the one hand, if a seller over-estimates the sales tax due, then the seller collects more sales tax from the buyers than was due. Of course, the seller may not keep this surplus sales tax, but instead must pay it to the tax authorities—if the seller cannot refund it to the buyers. If a buyer later learns that they paid unnecessarily more sales tax than was due, the seller risks at least harm to their reputation. Sometimes the buyer will have the option to ask the state for a refund of the excess tax by sending an explanation and the receipt, but that is often not done as it is too cumbersome for the amounts of money involved. On the other hand, if a seller under-estimates the sales tax due, then the seller collects less sales tax from the buyers, and therefore pays less sales tax to the authorities than was actually due. That is an underpayment of sales tax that will likely be discovered later, if the tax authority audits the seller. Then the seller will be required to pay the difference, plus fines and/or late fees, because ignorance of the law is not an excuse. Further, one should note that sales taxes can be considered trust-fund taxes, meaning that the management of a company may be held personally liable for the unpaid sales tax.

For sales in particular, making correct determinations for sales and use tax is even more complex, and therefore difficult. There are a number of factors that contribute to the complexity.

First, some state and local tax authorities have origin-based tax rules, while others have destination-based tax rules. Accordingly, a sales tax may be charged from the seller's location, meaning according to the rules of the tax authority of the seller, or from the buyer's location, meaning according to the rules of the tax authority of the buyer.

Second, the various tax authorities assess different, i.e., non-uniform, percentage rates of the sales price as sales tax, for the purchase and sale of items that involve their various tax jurisdictions. These tax jurisdictions include various states, counties, cities, municipalities, special taxing jurisdictions, and so on. As the United States switched, largely but not completely, from primarily origin-based sales tax to destination-based tax, the number of tax jurisdictions rapidly multiplied, and the incentives for local governments to implement new and varied tax rules and ever smaller jurisdictions multiplied. As such, there are over 10,000 different tax jurisdictions in the US, with many partially overlapping. Their sizes vary from as large as many square miles to as small as a single building. In parallel, tens of thousands of tax rules and tax rates have been developed.

Third, in some instances no sales tax is due at all because of the type of item sold. For example, in 2018 selling cowboy boots was exempt from sales tax in Texas, but not in New York. This non-uniformity gives rise to numerous individual taxability rules related to various products and services across different tax jurisdictions.

Fourth, in some instances no sales tax is due at all because of who the individual buyer is, and/or what the purchase is for. For example, certain entities are exempt from paying sales tax on their purchases, as long as they properly create and sign an exemption certificate and give it to the seller for each purchase made. Entities that are entitled to such exemptions may include wholesalers, resellers, non-profit charities, educational institutions, etc. Of course, who can be exempt is not exactly the same in each tax jurisdiction. And, even when an entity is entitled to be exempt, different tax jurisdictions may have different requirements for the certificate of exemption to be issued and/or remain valid. And, certificates of exemption may expire after some time, and may need to be renewed or reissued.

Fifth, it can be hard to determine which tax authorities a seller owes sales tax to. A seller may start with tax jurisdictions that it has a physical presence in, such as a main office, a distribution center or warehouse, an employee working remotely, and so on. Such ties with a tax jurisdiction establish the so-called physical nexus. However, a tax authority such as a state or even a city may set its own nexus rules for when a business is considered to be "engaged in business" with it, and therefore that business is subject to registration and collection of sales taxes. These nexus rules may include different types of nexus, such as affiliate nexus, click-through nexus, cookie nexus, economic nexus with thresholds, and so on. For instance, due to economic nexus, a remote seller may owe sales tax for sales made in the jurisdiction that are a) above a set threshold volume, and/or b) above a set threshold number of sales transactions.

The economic nexus mentioned above can be even more complicated. Even where a seller might not have reached any of the thresholds for economic nexus, a number of states are promulgating marketplace facilitator laws that sometimes use such thresholds. According to such laws, intermediaries that are characterized as marketplace facilitators per laws of the state may have an obligation, instead of the seller, to collect sales tax on behalf of their sellers, and remit it to the state. The situation becomes even more complex when a seller sells directly to a state, and also via such an intermediary.

To help with such complex determinations, the OSP computer system 1395 may be specialized for tax compliance. The OSP computer system 1395 may have one or more processors and memory, and be adapted to implement a tax engine to make the determinations of tax obligations.

The OSP computer system 1395 may further store locally entity data, i.e. data of user 1392 and/or of entity 1393, either of which/whom may be a customer, and/or a seller or a buyer in a sales transaction. The entity data may include profile data of the customer, and transaction data from which a determination of a tax obligation is desired. This entity data may be inputted by the user 1392, and/or caused to be downloaded or uploaded by the user 1392 from the seller computer system 1390 or from the OPF 1389, or extracted from the seller computer system 1390 or from the OPF 1389, and so on. In other implementations, a simpler memory configuration may suffice for storing the entity data.

A digital tax content 1386 is further implemented within the OSP 1398. The digital tax content 1386 can be a utility that stores digital tax rules for use by the OSP computer system 1395, as will be described later in this document.

For a specific determination of a tax obligation, the OSP computer system 1395 may receive one or more datasets. A generalized and abbreviated version of a sample received outbound dataset 1335 is shown below line 1315. In this example, the seller computer system 1390 transmits a request 1384 that includes a payload 1334, and the outbound dataset 1335 is received by the OSP computer system 1395 parsing the received payload 1334. In this example the single payload 1334 encodes the entire outbound dataset 1335, but that is not required, as mentioned above.

Figure 14:
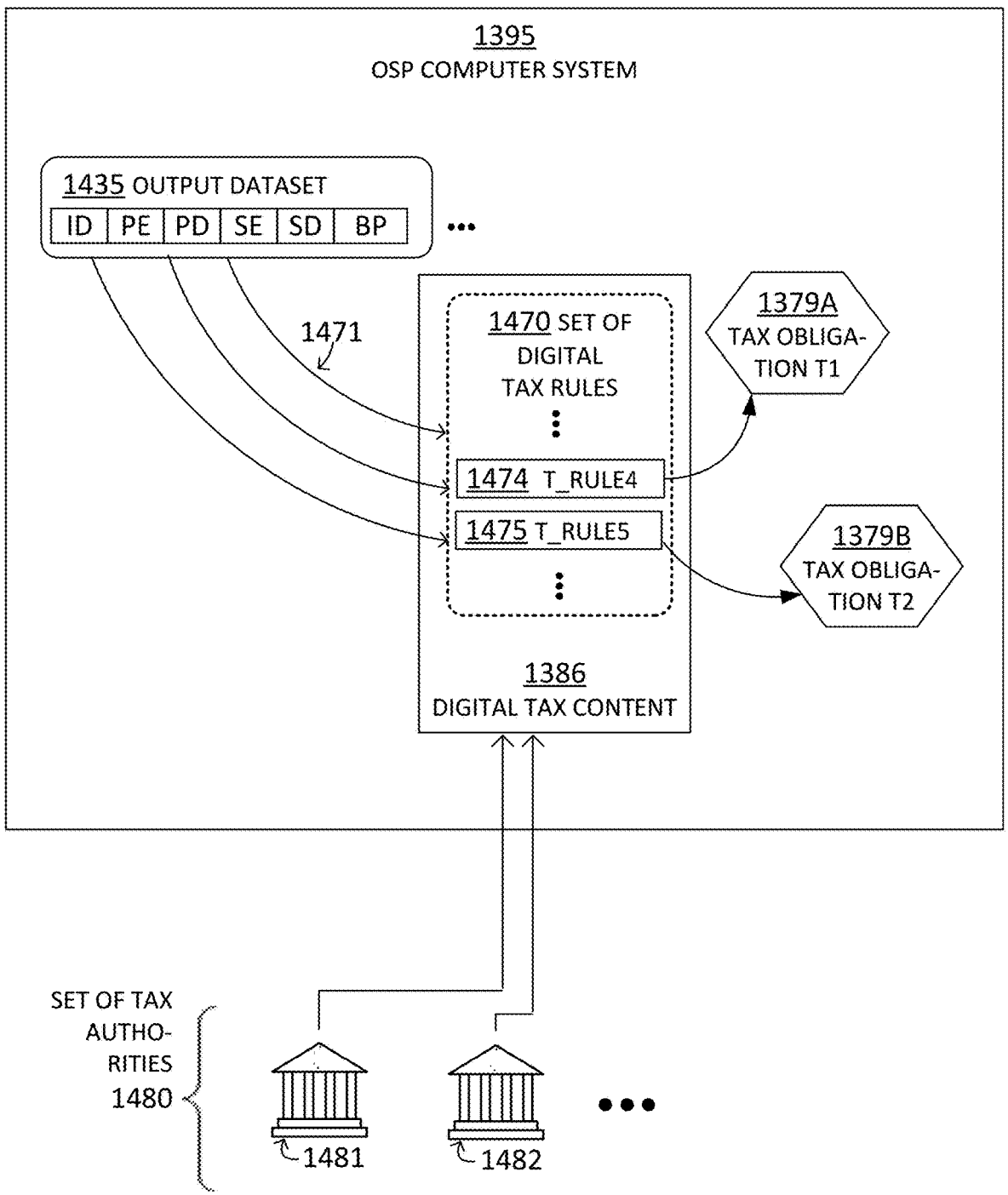
FIG. 14 is a diagram showing sample aspects of the embodiments of FIG. 13.

Referring now to FIG. 14, an outbound dataset 1435 is a fuller version of the sample received outbound dataset 1335. The outbound dataset 1435 has parameters that can also be called dataset parameters, and can be otherwise examples of what was described for the outbound dataset 135 of FIG. 1.

In this example, the outbound dataset 1435 has been received because it is desired to determine any tax obligations arising from the buy-sell transaction 1397. As such, the sample received outbound dataset 1435 has dataset parameters with values that characterize attributes of the buy-sell transaction 1397. Accordingly, in this example the sample received outbound dataset 1435 has a parameter ID with a value for an identity of the outbound dataset 1435 and/or the transaction 1397.

The outbound dataset 1435 also has a parameter PE with a value for the name of the primary entity 1393 or the user 1392, which can be the seller making sales transactions, some perhaps online. The outbound dataset 1435 further has an optional parameter PD with a value for relevant data of the primary entity 1393 or the user 1392, such as an address, place(s) of business, prior nexus determinations with various tax jurisdictions, and so on. The parameter PD is optional because it may be possible to look up its value from the parameter PE.

The outbound dataset 1435 also has a parameter SE with a value for the name of the secondary entity 1396, which can be the buyer. The outbound dataset 1435 further has a parameter SD with a value for relevant data of the secondary entity 1396, entity-driven exemption status, and so on. In some instances, the parameter SD is optional, similarly with the parameter PD.

The outbound dataset 1435 has a parameter BP with a numerical value for the sale price, or base price, of the item sold. The outbound dataset 1435 may further have additional dataset parameters, as indicated by the dot-dot-dot on the right side of the outbound dataset 1435. These additional parameters may characterize further attributes, such as what item was sold, for example by a Stock Keeping Unit (SKU), how many units of the item were sold in the transaction 1397, a date and possibly also time of the transaction 1397, and so on.

In the example of FIG. 14, the digital tax content 1386 includes a set of digital tax rules 1470, analogous to the set 370. The digital tax rules 1470 are digital in that they are implemented for use by software, similarly with these rules in the set 370. In the example of this diagram, only two sample digital tax rules are shown explicitly, namely rule T_RULE4 1474 and T_RULE5 1475. In this diagram, all other such rules are indicated by the vertical dot-dot-dots.

The digital tax rules 1470 can be created so as to accommodate legal tax rules that the set 1480 of different tax authorities 1481, 1482, . . . promulgate to apply within the boundaries of their tax jurisdictions. As mentioned above, the number of the different tax authorities in the set 1480 may be very large. In such use cases, tax jurisdictions such as a country, a state, a county, a city, a municipality, etc. correspond to domains discussed earlier in this document.

Then the OSP computer system 1395 may thus select some of the digital tax rules 1470 responsive to one or more of the dataset values of the dataset parameters of the outbound dataset 1435, as indicated by the arrows 1471. For instance, it can be determined that, at the time of the sale, the buyer 1396 is located within the boundaries of a tax jurisdiction, that the seller 1393 has nexus with that tax jurisdiction, and that there is no tax holiday.

As such, the OSP computer system 1395 may produce the tax obligations 1379A, 1379B, which is akin to producing the resources 179A, 179B of FIG. 1. In this example, one of the digital tax rules may specify that a sales tax is due, that the amount is to be determined by a multiplication of the base price of the value of the parameter BP by a specific rate, and so on.

The digital tax rules 1470 can be implemented or organized in different ways. For example, these digital tax rules 1470 may have applicability conditions that relate to geographical boundaries, effective dates with possible temporary exceptions, item classification into categories, differently-treated parties, and so on, for determining where and when a certain digital tax rule is to be selected and applied, to determine the tax obligations 1379A, 1379B. These conditions may be expressed as logical conditions with ranges, dates, other data, and so on. Values of the dataset parameters of the outbound dataset 1435 can be iteratively tested against these logical conditions according to arrows 1471. In such cases, the applicable tax rules may indicate how to compute one or more tax obligations, such as to indicate different types of taxes that are due, rules, rates, exemption requirements, reporting requirements, remittance requirements, the actual amounts of tax obligations, etc.

As with the digital resource rules in the set 370, the digital tax rules 1470 may also be complex. While a certain one of these digital resource rules is eventually selected and applied to determine the tax obligation, more than one of them may be used for selecting that certain digital resource rule.

Figure 15:
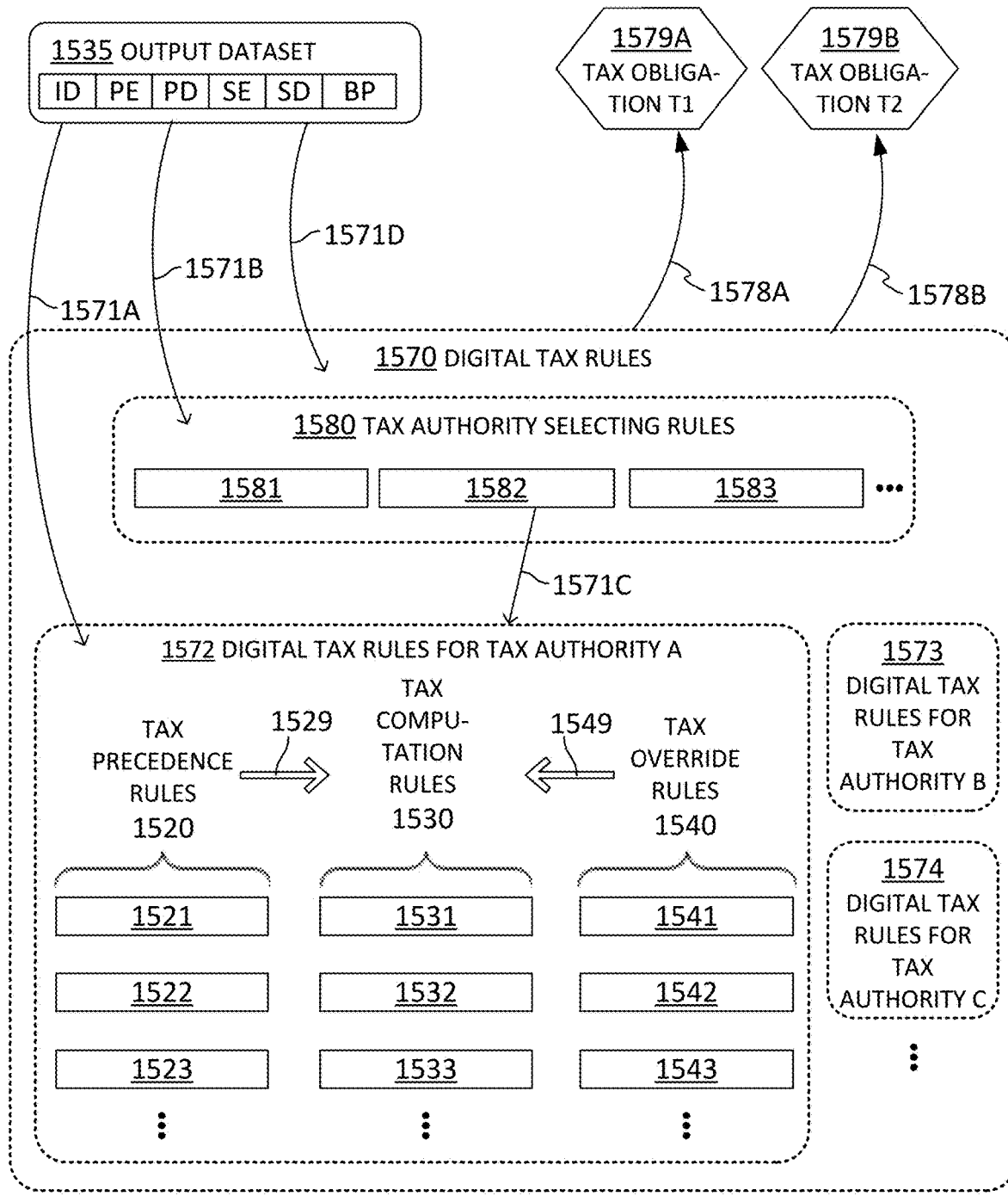
FIG. 15 is a diagram showing details and aspects of different types of possible embodiments of the digital tax rules of the use cases of FIG. 14.

Referring now to FIG. 15, an outbound dataset 1535 can be as described for the outbound dataset 1435 of FIG. 14. In addition, a set 1570 of digital tax rules is an example of the digital tax rules 1470 of FIG. 14. Tax obligations 1579A, 1579B can be produced according to arrows 1578A, 1578B. The tax obligations 1579A, 1579B can be as described for the tax obligations 1379A, 1379B. And it will be further recognized that FIG. 15 has many similarities with FIG. 4. This is intentional, so that portions of the explanations for FIG. 4 also apply to FIG. 15.

The set 1570 of digital tax rules shows examples for digital tax rules, such as the digital tax rules 1470 of FIG. 14. The set 1570 of digital tax rules includes different subsets, into which the individual rules belong. In addition, there can be hierarchical relationships among rules of different subsets, and/or of types. In this example, the set 1570 includes a subset 1580 of tax authority selecting rules. The set 1570 also includes subsets 1572, 1573, 1574, . . . , each for digital tax rules for tax authorities A, B, C, . . . respectively. A tax authority for which a subset of tax rules is thus provided could be associated with the primary entity 1393, another tax authority could be associated with the secondary entity 1396, and so on. In cases where digital tax rules are provided only for the tax authority A, the tax obligations 1579A, 1579B will be determined by starting from an arrow 1571A.

The subset 1580 includes rules 1581, 1582, 1583, . . . . The subset 1580 may be invoked, e.g. per an arrow 1571B, when multiple jurisdictions are candidates. These rules may select which tax jurisdiction's rules will be applied, e.g. per an arrow 1571C. For instance, the rules of the subset 1580 may be used to resolve whether a sales tax determination will be origin-based or destination-based. This may depend on appropriate rules of the tax jurisdictions themselves. Then the rules of the subset 1580 may point to the digital tax rules of one or more tax authorities whose legal tax rules must be followed. For instance, and as mentioned above, a buy-sell transaction may be burdened by a sales tax from the tax jurisdictions of a state and of a city. These could invoke, respectively, the subsets 1572 and 1573.

Digital tax rules for individual tax authorities are now described. Such rules need not be the same for each tax authority, or of the same type for each domain. The sample subset 1572 of digital tax rules for tax authority A is now described in more detail. Its description can be similar for subsets for other domains, such as the subsets 1573, 1574, . . . .

The subset 1572 includes different types of rules. In this example, the subset 1572 includes tax precedence rules 1520, tax computation rules 1530, and tax override rules 1540. In this example, the tax precedence rules 1520 include rules 1521, 1522, 1523, . . . . The tax computation rules 1530 include rules 1531, 1532, 1533, . . . . The tax override rules 1540 include rules 1541, 1542, 1543, . . . .

In embodiments, one of the tax computation rules 1530 may ordinarily be selected as the certain digital tax rule, which in FIG. 14 is shown as rule T_RULE4 1474. For instance, it may specify a percentage tax rate for the sales tax. The tax obligation 1579A may be the percentage rate. Or, the purchase price (base value of the parameter BP) may be further learned from the outbound dataset 1535, e.g. per an arrow 1571D, and the tax obligation 1579A may be the sales tax amount, produced by multiplying the percentage rate by the purchase price.

In addition, although not always required, the different types of rules within the subset 1572 further have different hierarchies among them.

For a first instance, one of the tax precedence rules 1520 may indicate which one of the tax computation rules 1530 is to be selected, as generally indicated by an arrow 1529. As an example, one of the tax precedence rules 1520 may decide the taxability of a specific item indicated in the outbound dataset 1535. Such a tax precedence rule may implement, therefore, an item classification task. The answer can be no sales tax, or different sales tax depending on different categories. For instance, bagels may be taxed differently depending on whether or not they are sold with utensils, based on whether or not they are pre-sliced at the time they are sold, and so on. Then the precedence rule may indicate which one of the tax computation rules 1530 is the appropriate one to use for the computation of the sales tax. As another example, one of the tax precedence rules 1520 may indicate that there is a temporary sales tax holiday in a tax jurisdiction on the day of the transaction, in which case the sales tax for the transaction 1397 of FIG. 13 will be zero, and the tax obligation will be computed accordingly. As one more example, one of the tax precedence rules 1520 may indicate that there is no economic nexus for this transaction which, alone or in combination with other nexus determinations, may determine that no sales tax will be imposed.

For a second instance, even when one of the tax computation rules 1530 is thus indicated, one of the tax override rules 1540 may still override the indication, as generally indicated by an arrow 1549. As an example, one of the tax override rules 1540 may indicate that a party is exempt from paying sales tax because certain conditions are met, for instance if they have a valid and current exemption certificate. As another example, rules for implementing cases where the sales tax computation is overridden and no sales tax is due, such as with a tax holiday or lack of economic nexus, may instead be implemented as the tax override rules 1540.

Returning to FIG. 13, below the line 1315, a computer system 1340 is shown. In some embodiments, the computer system 1340 is the seller computer system 1390. In other embodiments, the computer system 1340 is controlled by the primary entity 1393, and could be in the cloud, communicating with the seller computer system 1390. For instance, in such embodiments, the computer system 1340 could be in the OPF 1389.

The computer system 1340 has one or more processors 1341 and a memory 1342. The memory 1342, which is a non-transitory computer-readable medium, is configured to store programs 1343 and data 1344. The programs 1343 may include instructions that can be executed by the one or more processors 1341.

Handling settings 1347 reside in the memory 1342. The handling settings 1347 may be some of the programs 1343 and the data 1344. The handling settings 1347 have options, one of which can be selected. The handling settings 1347 can be about requiring or not a certain summation of values in datasets.

The handling settings 1347 may be part of an optional connector 1348. In the event that the computer system 1340 is indeed the seller computer system 1390, then the connector 1348 can be a local connector 1348.

In embodiments, the handling settings 1347 are input by the computer system 1340. In some of these embodiments, the handling settings 1347 are thus input via a user interface (UI). In some of these embodiments, the handling settings 1347 are thus input by a UI by the user 1392 of the primary entity 1393. An example is now described.

Figure 16:
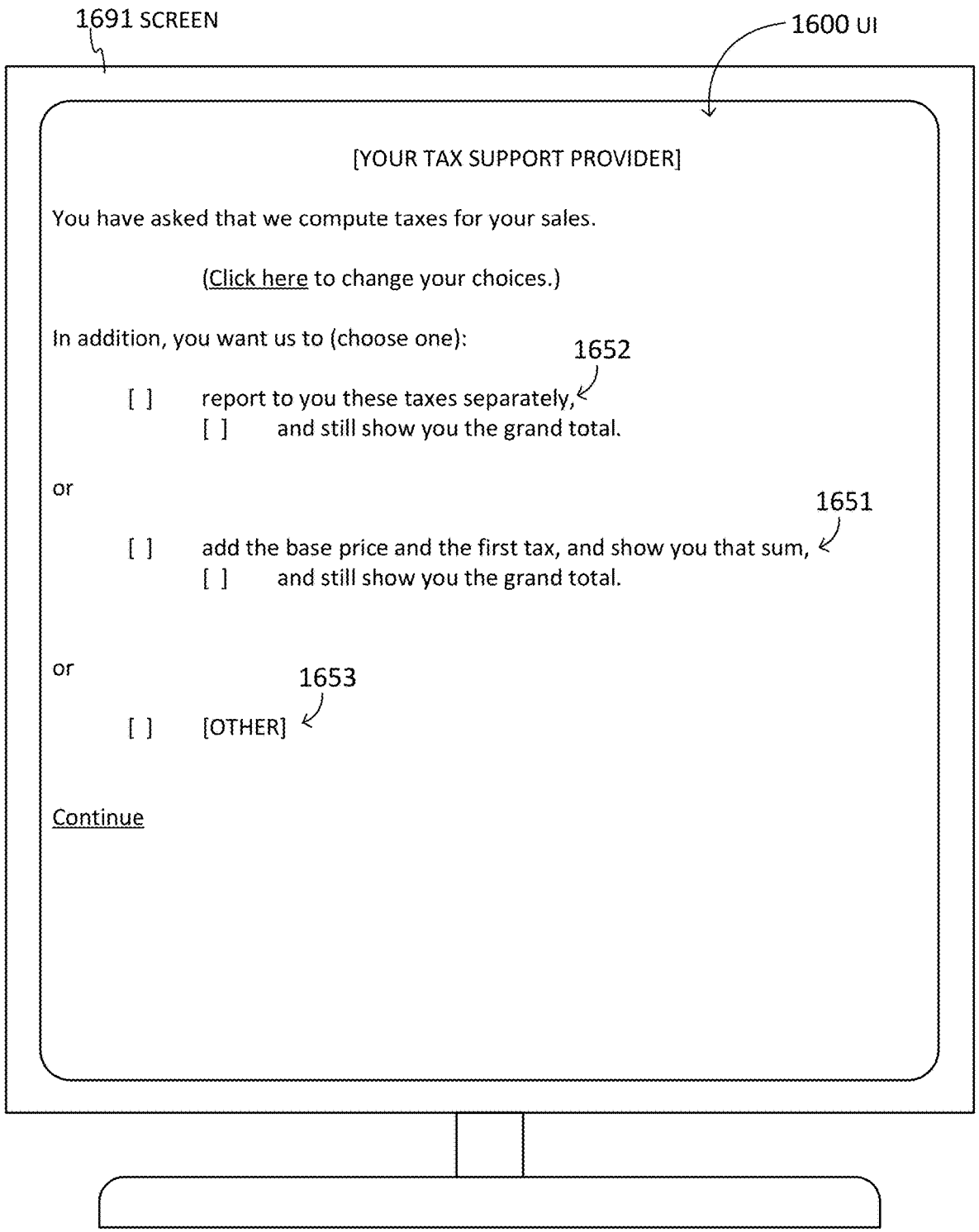
FIG. 16 is a sample view of a User Interface (UI) for inputting a selected of option of handling settings according to a use case of an embodiment.

FIG. 16 is a sample view of a User Interface (UI) 1600, shown on a screen 1691. The screen 1691 could be the screen 1391 of FIG. 13. The UI 1600 can be used to input the selected option of the handling settings 1347. In particular, the UI 1600 presents options 1651, 1652, 1653, for the user to select one. The option 1651 is also known as the first option, and requires the certain summation. The option 1652 is also known as the second option, and does not require the certain summation. In this example, there is also the option 1653, which is yet different from the other two options.

Returning to FIG. 13, transaction data is input by the computer system 1340. At least some of it can be among the data 1344. At least some of it can be received from another device, such as the device 1332.

A sample outbound dataset 1335 is shown below the line 1315. Here it is shown before its transmission as the payload of the outbound request 1384. The outbound dataset 1335 can be constructed by the computer system 1340, from the input relationship instance data.

The OSP computer system 1395 may be further configured to cause to be transmitted for receipt by the seller computer system 1390, in response to receiving the outbound dataset 1335, an inbound dataset 1375. In particular, the OSP computer system 1395 may cause the inbound dataset 1375 to be communicated by being encoded as a payload 1337, which is carried by a response 1387. The response 1387 may be transmitted via the communications network 1388 responsive to the received request 1384. The inbound dataset 1375 may encode the value of the first tax obligation T1 1379A and the value of the second tax obligation T2 1379B.

A pointer operation 1350 is used to depict the options of the handling settings 1347 in the example of FIG. 13. When a switch 1359 points to the right as shown, a first option is selected, which requires the certain summation described above. In this use case, the certain summation is to sum, i.e. add together, the base price BP and the first tax value T1, but not summing with them the second tax value T2. The summed value is shown by a circle 1373. This first option can be selected, for instance, by selecting the option 1651 of the UI 1600. However, when the switch 1359 points to the left, a second option is selected that does not require the certain summation. This second option can be selected by selecting the option 1652 of the UI 1600. The first tax value T1 is shown by a circle 1371. The second tax value T2 is shown by a circle 1372. The brackets grouping the circles show the set of values that can be forwarded for each option, somewhat similarly with what was shown in FIG. 1.

Figure 17:
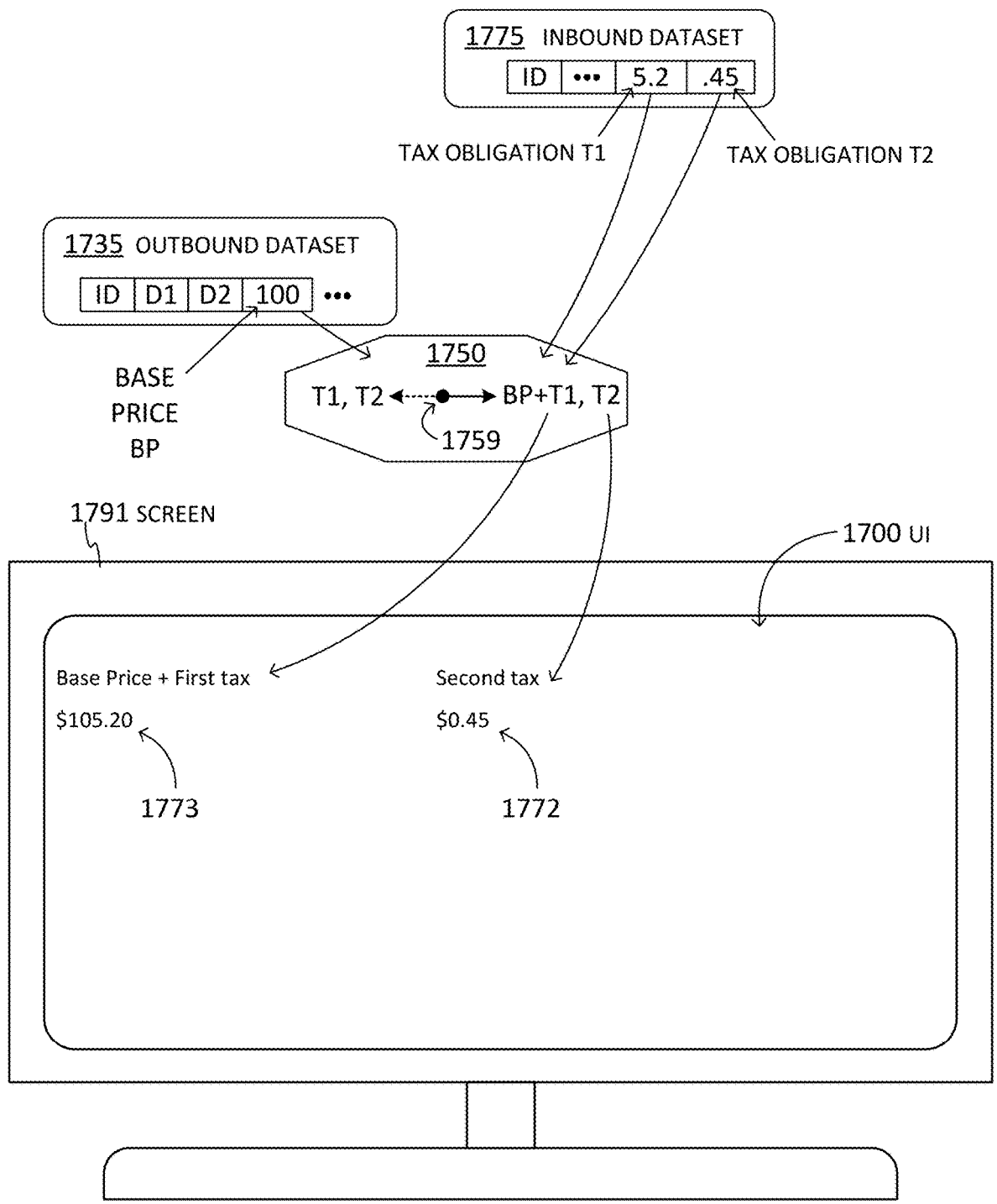
FIG. 17 is a composite diagram showing how parameter values may be displayed in a User Interface (UI), in a use case of an embodiment.

FIG. 17 repeats salient elements of FIG. 13, but with specific numerical values. In particular, an outbound dataset 1735 can be the outbound dataset 1335. The base price BP is 100. An inbound dataset 1775 has been identified and matched. The value of the first tax obligation T1 is 5.2 and the value of the second tax obligation T2 is 0.45. A pointer operation 1750 has a switch 1759 that points to the right, and which therefore indicates that the handling settings (not shown) require the certain summation of FIG. 13.

A screen 1791 is the output device, and displays a User Interface (UI) 1700. The UI 1700 shows the summed value 1773, which arises from 100+5.2=105.20. The UI 1700 shows the second tax value 1772. The UI 1700 further shows appropriate headings over the values 1773, 1772.

General

In the methods described above, each operation can be performed as an affirmative act or operation of doing, or causing to happen, what is written that can take place. Such doing or causing to happen can be by the whole system or device, or just one or more components of it. It will be recognized that the methods and the operations may be implemented in a number of ways, including using systems, devices and implementations described above. In addition, the order of operations is not constrained to what is shown, and different orders may be possible according to different embodiments. Examples of such alternate orderings may include overlapping, interleaved, interrupted, reordered, incremental, preparatory, supplemental, simultaneous, reverse, or other variant orderings, unless context dictates otherwise. Moreover, in certain embodiments, new operations may be added, or individual operations may be modified or deleted. The added operations can be, for example, from what is mentioned while primarily describing a different system, apparatus, device or method.

At least one of the methods of this description, when implemented by a computer, can be performed at the rate of at least 10 times per second.

A person skilled in the art will be able to practice the present invention in view of this description, which is to be taken as a whole. Details have been included to provide a thorough understanding. In other instances, well-known aspects have not been described, in order to not obscure unnecessarily this description.

The technique of three dots in the drawings: The drawings associated with this document may show three dots drawn in sequence, and in any orientation. This document may refer to a shown set of such three dots as "dot-dot-dot". Where shown next to an element, this set of three dots is used to indicate possible additional such elements while omitting drawing them, which helps unclutter the drawings. This technique for the drawings is analogous to the ellipsis used in writing. In particular, an ellipsis is a punctuation mark that consists of three dots or periods ( . . . ), and is used to indicate possibly more of what it follows, perhaps in sequence, while omitting writing the possibly more.

Some technologies or techniques described in this document may be known. Even then, however, it does not necessarily follow that it is known to apply such technologies or techniques as described in this document, or for the purposes described in this document.

This description includes one or more examples, but this fact does not limit how the invention may be practiced. Indeed, examples, instances, versions or embodiments of the invention may be practiced according to what is described, or yet differently, and also in conjunction with other present or future technologies. Other such embodiments include combinations and sub-combinations of features described herein, including for example, embodiments that are equivalent to the following: providing or applying a feature in a different order than in a described embodiment; extracting an individual feature from one embodiment and inserting such feature into another embodiment; removing one or more features from an embodiment; or both removing a feature from an embodiment and adding a feature extracted from another embodiment, while providing the features incorporated in such combinations and sub-combinations.

In general, the present disclosure reflects preferred embodiments of the invention. The attentive reader will note, however, that some aspects of the disclosed embodiments extend beyond the scope of the claims. To the respect that the disclosed embodiments indeed extend beyond the scope of the claims, the disclosed embodiments are to be considered supplementary background information and do not constitute definitions of the claimed invention.

In this document, the phrases "constructed to", "adapted to" and/or "configured to" denote one or more actual states of construction, adaptation and/or configuration that is fundamentally tied to physical characteristics of the element or feature preceding these phrases and, as such, reach well beyond merely describing an intended use. Any such elements or features can be implemented in a number of ways, as will be apparent to a person skilled in the art after reviewing the present disclosure, beyond any examples shown in this document.

Incorporation by reference: References and citations to other documents, such as patents, patent applications, patent publications, journals, books, papers, web contents, have been made throughout this disclosure. All such documents are hereby incorporated herein by reference in their entirety for all purposes.

Parent patent applications: Any and all parent, grandparent, great-grandparent, etc. patent applications, whether mentioned in this document or in an Application Data Sheet ("ADS") of this patent application, are hereby incorporated by reference herein as originally disclosed, including any priority claims made in those applications and any material incorporated by reference, to the extent such subject matter is not inconsistent herewith.

Reference numerals: In this description a single reference numeral may be used consistently to denote a single item, aspect, component, or process. Moreover, a further effort may have been made in the preparation of this description to use similar though not identical reference numerals to denote other versions or embodiments of an item, aspect, element, component or process that are identical, or at least similar or related. Where made, such a further effort was not required, but was nevertheless made gratuitously so as to facilitate comprehension by the reader. Even where made in this document, such a further effort might not have been made completely consistently for all of the versions or embodiments that are made possible by this description. Accordingly, the description controls in defining an item, aspect, element, component or process, rather than its reference numeral. Any similarity in reference numerals may be used to infer a similarity in the text, but not to confuse aspects where the text or other context indicates otherwise.

The claims of this document define certain combinations and subcombinations of elements, features and acts or operations, which are regarded as novel and non-obvious. The claims also include elements, features and acts or operations that are equivalent to what is explicitly mentioned. Additional claims for other such combinations and subcombinations may be presented in this or a related document. These claims are intended to encompass within their scope all changes and modifications that are within the true spirit and scope of the subject matter described herein. The terms used herein, including in the claims, are generally intended as "open" terms. For example, the term "including" should be interpreted as "including but not limited to," the term "having" should be interpreted as "having at least," etc. If a specific number is ascribed to a claim recitation, this number is a minimum but not a maximum unless stated otherwise. For example, where a claim recites "a" component or "an" item, it means that the claim can have one or more of this component or this item.

In construing the claims of this document, the inventor(s) invoke 35 U.S.C. § 112(f) only when the words "means for" or "steps for" are expressly used in the claims. Accordingly, if these words are not used in a claim, then that claim is not intended to be construed by the inventor(s) in accordance with 35 U.S.C. § 112(f).

What is claimed is:

1. A computer system, including at least:
one or more processors; and
a non-transitory computer-readable storage medium having stored thereon instructions which, when executed by the one or more processors, are designed to result in operations including at least:
inputting, by the computer system, a selected one of options of handling settings, a first one of the options requiring a certain summation of values in datasets, and a second one of the options not requiring the certain summation;
inputting, by the computer system, relationship instance data of a relationship instance between a primary entity and a secondary entity, the relationship instance data including an attribute of one of the primary entity and the secondary entity and a base value for the relationship instance,
constructing, by the computer system and from the input relationship instance data, an outbound dataset having dataset parameters, at least some of the dataset parameters having respective dataset values, at least a first one of the dataset values characterizing the attribute, at least a second one of the dataset values encoding the base value;
causing, by the computer system, the outbound dataset to be transmitted by a primary entity computer system, across a network, to an Online Software Platform (OSP) computer system that is distinct from the computer system,
the OSP computer system configured, responsive to receiving the outbound dataset, to select, responsive to the first dataset value, a digital resource rule from a set of digital resource rules and to produce, by applying the selected digital resource rule to the second dataset value, a first resource value different from the base value,
the OSP computer system further configured to produce, according to at least one digital resource rule of the set of the digital resource rules, a second resource value different from the first resource value and from the base value,
the OSP computer system further configured to cause to be transmitted for receipt by the primary entity computer system, responsive to receiving the outbound dataset, an inbound dataset encoding the first resource value and the second resource value;
inputting, by the computer system and responsive to the primary entity computer system receiving the transmitted inbound dataset, the first resource value and the second resource value from the inbound dataset; and
summing, by the computer system and according to the certain summation, the base value and the first resource value but not the second resource value, to produce a summed value responsive to the first one of the options being the selected one of the options of the handling settings, and
then causing, by the computer system, the summed value to be forwarded to an output device, or
else causing, by the computer system, the first resource value and the second resource value to be forwarded to the output device responsive to the second one of the options being the selected one of the options of the handling settings.

2. The computer system of claim 1, in which:
the computer system is the primary entity computer system.

3. The computer system of claim 1, in which:
the computer system is controlled by the primary entity.

4. The computer system of claim 1, in which:
the selected one of the options of the handling settings is input via a user interface (UI) that presents the first one of the options and the second one of the options.

5. The computer system of claim 1, in which:
the selected one of the options of the handling settings is are input via by a user interface (UI) by a user of the primary entity.

6. The computer system of claim 1, in which:
the output device is part of the computer system.

7. The computer system of claim 1, in which:
the output device is part of a computer system other than the computer system.

* * * * *